(12) United States Patent
Cameron et al.

(10) Patent No.: US 6,944,626 B2
(45) Date of Patent: Sep. 13, 2005

(54) DYNAMICALLY GENERATED SCHEMA REPRESENTING MULTIPLE HIERARCHIES OF INTER-OBJECT RELATIONSHIPS

(75) Inventors: Kim Cameron, Bellevue, WA (US); Stewart P. MacLeod, Woodinville, WA (US); George G. Robertson, Seattle, WA (US); James H. Booth, Issaquah, WA (US); Luc Clement, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 561 days.

(21) Appl. No.: 09/995,415

(22) Filed: Nov. 26, 2001

(65) Prior Publication Data

US 2003/0177139 A1 Sep. 18, 2003

(51) Int. Cl.[7] .............................................. G06F 17/00
(52) U.S. Cl. .................... 707/103 R; 707/100; 707/102
(58) Field of Search ................................ 707/100, 102, 707/103 R, 103 Y

(56) References Cited

U.S. PATENT DOCUMENTS

| | | | |
|---|---|---|---|
| 5,802,511 A | | 9/1998 | Kouchi et al. |
| 5,859,978 A | | 1/1999 | Sonderegger et al. |
| 6,223,145 B1 | * | 4/2001 | Hearst .......................... 703/22 |
| 6,285,366 B1 | * | 9/2001 | Ng et al. ..................... 345/853 |
| 6,434,564 B2 | * | 8/2002 | Ebert .......................... 707/100 |
| 6,442,557 B1 | * | 8/2002 | Buteau et al. .............. 707/102 |
| 6,463,420 B1 | | 10/2002 | Guidice et al. |
| 6,564,263 B1 | * | 5/2003 | Bergman et al. ............ 709/231 |
| 6,643,652 B2 | | 11/2003 | Helgeson et al. |
| 6,708,161 B2 | | 3/2004 | Tenorio et al. |
| 2001/0047385 A1 | | 11/2001 | Tuatini |
| 2002/0169744 A1 | * | 11/2002 | Cooke et al. |
| 2004/0002982 A1 | | 1/2004 | Ersek et al. |

OTHER PUBLICATIONS

Chita, Christian (Hierarchy Visualization).*
T. Howes, et al., "The LDAP URL Format", The Internet Society, Dec. 1997, 8 pages.
M. Wahl, "A Summary of the X.500(96) User Schema for use with LDAPv3", The Internet Society, Dec. 1997, 20 pages.

(Continued)

*Primary Examiner*—Frantz Coby
*Assistant Examiner*—Haythim Alaubaidi
(74) *Attorney, Agent, or Firm*—Lee & Hayes PLLC

(57) ABSTRACT

The described arrangements and procedures provide for interfacing (e.g., managing, presenting, etc.) with complex and often elastic inter-object relationships between objects in a data polyarchy. Specifically, a schema is dynamically generated by a server to represent multiple hierarchies of inter-object relationships between objects in a data polyarchy. The schema indicates or lists each attribute or element of interest in the data polyarchy. The schema further indicates any of one or more dimensions of inter-object relationships within which objects that comprise at least a subset of the listed the elements of interest participate. Thus, the schema indicates how to interface with the data polyarchy, which represents multiple hierarchies of inter-object relationships based on the values of attributes of the represented objects.

70 Claims, 14 Drawing Sheets

OTHER PUBLICATIONS

M. Wahl, et al., "Lightweight Directory Access Protocol (v3)", Internet Society, Dec. 1997, 50 pages.

M. Wahl, et al, "Lightweight Directory Access Protocol (v3): UTF–8 String Representation of Distinguished Names", The Internet Society, 10 pages.

T. Howes, "The String Representation of LDAP Search Filters", The Internet Society, 8 pages.

M. Wahl et al, "Lightweight Directory Access Protocol (v3): Attribute Syntax Definitions", The Internet Society, Dec. 1997, 32 pages.

Melbourne, "The Directory—Overview of Concepts, Models and Services", 1988, 47 pages.

"Information Technology—Open Systems Interconnection—The Directory: The Models", Recommendation X.501, ISO/IEC 9594–2, Feb. 14, 1993, 164 pages.

Biron et al.; (www.w3.org) discloses a "XML Schema Part 2: Datatypes" W3C Recommendations May 2, 2001, pp. 1–21.

* cited by examiner

610

```
<EQUAL ELEMENT='SN' VALUE = 'DOE'>
```
— 510-1

618

```
<?XML VERSION="1.0">
-<ENVELOPE>
 -<BODY>
  -<M:QUERY XMLNS:M="URN:UIDB34543434->
    <EQUAL ELEMENT='SN' VALUE = 'DOE'>
  -</M:QUERY>
 -</BODY>
-</ENVELOPE>
```

614 / 620 / 612

```
<? XML VERSION = "1.0"?>
<ENVELOPE>
<BODY>
<QUERY RESULT>
<PERSON LOCAL I D = "414443">
<GLUE ID>34563463-DFG-645634-SDFDF </GLUE ID>
<CN> JOHN DOE </CN>
<ROOM NUMBER>3346</ROOM NUMBER>
<UID>JDOE</UID>
<SN>DOE</SN>
<GIVEN NAME> JOHN</GIVEN NAME>
<BUILDING NAME> RED BUILDING</BUILDING NAME>
<TITLE> SOFTWARE SUPPORT ANALYST</TITLE>
<LOCATIONUPNODE>L 234 RED BUILDING</LOCATIONUPNODE>
<UNIQUE IDENTIFIER>455675478</UNIQUE IDENTIFIER>
<MANAGER>5657457</MANAGER>
<COST CENTER UP NODE>CCR 456</COST CENTER UP NODE>
</PERSON>

<PERSON LOCAL ID = "41KJH3">
<GLUE ID>898798-GFGHFJG87-HGJH</GLUE ID>
<CN> JIM DOE </CN>
<TELEPHONE NUMBER>888-888-9999</TELEPHONE
```

600 (overall figure)

610 / 510-2:
```
<EQUAL ELEMENT='SN' VALUE = 'DOE'>
<ELEMENTS OF INTEREST>
  <ELEMENT> CN </ELEMENT>
  <ELEMENT> UNIQUE IDENTIFIER </ELEMENT>
</ELEMENTS OF INTEREST>
```

618: (SOAP ENVELOPE—NOT SHOWN)

612 / 614 / 620 / 510-1:
```
<? XML VERSION = "1.0"?>
<ENVELOPE>
<BODY>
<QUERY>
<PERSON LOCAL ID = "414443">
<CN> JOHN DOE </CN>
<UNIQUE IDENTIFIER>455675478</UNIQUE IDENTIFIER>
</PERSON>
<PERSON LOCAL ID = "41KJH3">
<CN> JIM DOE </CN>
<UNIQUE IDENTIFIER>777</UNIQUE IDENTIFIER>
</PERSON>
<PERSON LOCAL ID = "444">
<CN> ALLAN DOE </CN>
<UNIQUE IDENTIFIER>5555</UNIQUE IDENTIFIER>
</PERSON>
<PERSON LOCAL ID = "66666">
<CN> KARL DOE </CN>
<UNIQUE IDENTIFIER>9999887</UNIQUE IDENTIFIER>
</PERSON>
<PERSON LOCAL ID = "333222">
<CN> BOB DOE </CN>
<UNIQUE IDENTIFIER>666555443</UNIQUE IDENTIFIER>
</PERSON>
```

```
<AND>
  <UNDER DIMENSION="MANAGEMENT"
    ELEMENT='UNIQUE IDENTIFIER' VALUE = '123456789'/>
  <UNDER DIMENSION='OFFICE LOCATION'
    ELEMENT='LOCATION' VALUE = 'L 234 RED BUILDING'/>
    <EQUAL ELEMENT='TITLE' VALUE = ARCHITECT'/>
</AND>
<ELEMENTS OF INTEREST>
  <ELEMENT> CN </ELEMENT>
</ELEMENTS OF INTEREST>

(SOAP ENVELOPE--NOT SHOWN)
```

```
<<? XML VERSION = "1.0"?>
<ENVELOPE>
<BODY>
<QUERY>
<PERSON LOCAL ID = "414443">
  <CN> JOHN DOE </CN>
</PERSON>
<PERSON LOCAL ID = "875437">
  <CN> MARK JEFFADA </CN>
</PERSON>
<PERSON LOCAL ID = "874981">
  <CN> PAUL LEPINSKA </CN>
</PERSON>
</QUERY>
</BODY>
</ENVELOPE>
```

Fig. 11

DYNAMICALLY GENERATED SCHEMA REPRESENTING MULTIPLE HIERARCHIES OF INTER-OBJECT RELATIONSHIPS

TECHNICAL FIELD

The following subject matter relates to object-to-object or "inter-object" relationships. More particularly, the subject matter pertains to interfacing with dynamically generated multiple hierarchies of inter-object relationships based on the values of attributes of the objects.

BACKGROUND

Any object can be linked, correlated, associated, differentiated, or in some manner categorized with respect to a different object to form implicit or explicit inter-object relationships. For instance, in an organization, a person typically has implicit and explicit relationships with other people in the organization, organizational resources (e.g., printers, facilities, etc.), geographical locations, business units, club memberships, and so on. Each implicit and/or explicit relationship between respective objects (i.e., the person, the other people, a resource, etc.) represents a respective hierarchical data relationship.

For example, one hierarchical data relationship is represented by each person within the company that has access to a specific resource (e.g., a building on the company campus, a room, a printer, etc); the resource being the root node of the hierarchy and the individuals with access to the resource being the leaves. Another hierarchical data relationship is represented by individuals that make up the management structure of the company. Other inter-object data relationships may represent a hierarchy of individuals within a particular business unit, all employees of the company that have specialized training, and so on.

Unfortunately, even though a data store can be configured to some extent by a network administrator to represent inter-object relationships within hierarchies of other data, complex inter-object relationships (e.g., such as those representing a single object within more than one hierarchy) are not simply and adequately represented using conventional data store (e.g., directory, database, etc.) systems and technologies. (Traditional directories include those based on the well-known X.500 standard and the Lightweight Directory Access Protocol (LDAP).

To illustrate this limitation of traditional data store systems and technologies, consider that a directory typically represents inter-object relationships using rigid data naming and inflexible directory schemas. Objects or nodes in the directory are organized within a single hierarchy with a root node at the top of the hierarchy. The root node has a name. Each other node in the directory is named based on its direct naming relationship to the root node and also with respect to each intervening node in the respective node's hierarchy. As a result, if a parent object is renamed in a single operation, any objects that are subordinate or children of the parent object are also renamed in that same single operation. This is because an object's full "distinguished name" includes the name of each parent object(s) all the way down the line to the root node's name.

It is the full distinguished name of an object that also represents its static location or data relationship with respect to each other object in the data store. Thus, an object's distinguished name inflexibly inter-tangles object naming within a single hierarchy with inter-object relationships in that hierarchy. Because of this, any navigation of the data store must be performed from top-to-bottom to determine and subsequently present any inter-object relationships—that is from the root object, to a parent object to any subordinate child object(s).

Because traditional data stores (e.g., directories, databases, and so on) rely on a carefully specified and inflexible object naming scheme to identify inter-object relationships, an administrator configuring the data store requires a-priori knowledge of the inter-object relationships when configuring the data store. Additionally, any configuration of the data store must consider not only the proper representation of inter-object relationships in the data store, but must also consider the heuristics that a search engine requires to navigate the data store.

To make matters worse, elastic data relationships are not easily described, represented, or navigated using conventional data store systems and techniques. An elastic data relationship is one wherein the relationship is derived from data that defines an object at any point in time. This means that over time elastic data relationships can be dynamic. For instance, consider the following non-obvious and potentially elastic data relationships: a Web site and the Web pages that make up the Web site, a customer and the individuated services that the customer purchases from a merchant, a personal computer (PC) and peripheral devices that are coupled to the PC, a city and the districts within the city, a business and the business contacts, an employee and the employee's dependents, and the like.

These non-obvious and potentially elastic data relationships are not easily represented because whenever a one-to-one correspondence between a surface object and corresponding sub-objects needs to be represented in the data store, an irreversible design choice must be made. (Conventional practice is to strictly control directory schema updates due to the serious nature of directory schema modification). A network administrator can opt for "total incorporation" of the sub-objects into the particular object by representing the sub-objects as attributes of the surface object in the directory schema. Or the network administrator can opt for "total distinction" of each object, by creating separate objects in the schema for sub-object components, and positioning the separate objects subordinate to the surface object.

To illustrate this irreversible design choice, consider that a particular network router includes multiple router modules plugged into the router's backplane. Information about the router and the router modules are typically stored in a directory in one or two different fashions—each of which may be equally unsatisfactory depending on how entities and their respective relationships to other entities are represented. One design choice is to characterize a router and its corresponding router modules as a single hierarchical data structure representing the network router as a parent object, and the corresponding router modules as child objects that are subordinate to the parent object. A different design choice is to characterize the router and the router's associated router modules as a single parent object with complex attributes. The parent object represents the router (backplane), and the complex attributes representing the respective router modules that are hosted by the router.

In consideration of the first design choice, depending how the router and the modules are configured, collapsing information about the router modules, or boards onto the backplane may prove unwieldy. This is because the functionality of the router's backplane may be small as compared to the functionality of the network router modules hosted by the router. Whereas considering the second design choice, completely separating the boards from the backplane may be equally unsatisfactory because the router is still a single physical router box that generally includes a number of router modules.

Both of the described solutions to representing data relationships with an inflexible directory schema are time consuming to implement and counter-intuitive, The semantics of shape and naming in the directory must be agreed on in advance to solve the simplest design problem. Thus, whenever a one-to-one correspondence between an entity and corresponding sub-entities needs to be represented in a traditional directory, an irreversible and inflexible design choice must be made within the directory schema.

Whichever design choice is selected, the data store and tools used to navigate, search and present objects within the data store with respect to inter-object relationships have been substantially limited. This is because the data store itself can not represent all of the possible implicit and explicit inter-object relationships of an object. This is considered by many computer programmers to be one of the most intractable problems of directory schema in traditional directories. This is also deemed to be the reason that computer program applications are not typically portable across directory platforms or even directory instances.

To further worsen matters, recent developments in information technology. Provide network administrators with opportunities to tie disparate data stores (e.g., databases, directories, and so on) of data together into a single logical directory or "metadirectory". Such disparate databases and directories include, for example, information corresponding to enterprise users, tangible and intangible resources, financial information, corporate e-mail systems, network operating systems, and soon.

Metadirectories present network administrators with complex and often elastic object data relationships that cannot be simply or adequately described, represented, navigated, or presented using traditional systems and procedures to configure and manage data stores. Considerable efforts are required on the part of the administrator (or a staff of administrators) to configure a data store. Manually determining and implementing such inter-object relationships (whether they be dynamic or not) is fraught with the potential for human error and oversight. Furthermore, database administrators with an appropriate level of such knowledge to perform such a directory configuration are expensive.

The following described subject matter addresses these and other problems of representing inter-object relationships.

SUMMARY

The described arrangements and procedures provide for interfacing (e.g., managing, presenting, etc.) with complex and often elastic inter-object relationships between objects in a data polyarchy. Specifically, a schema is dynamically generated by a server to represent multiple hierarchies of inter-object relationships between objects in a data polyarchy. The schema indicates or lists each attribute or element of interest in the data polyarchy. The schema further indicates any of one or more dimensions of inter-object relationships within which objects that comprise at least a subset of the listed the elements of interest participate. Thus, the schema indicates how to interface with the data polyarchy, which represents multiple hierarchies of inter-object relationships based on the values of attributes of the represented objects.

The generated schema is communicated to a client by a data polyarchy server.

Responsive to receiving a request from the client based on the schema, the server accesses one or more objects in the data polyarchy based on the request. The server transforms the one or more of the objects into data that expresses any inter-object relationships between the one or more objects in the data polyarchy based on the request. The server issues the transformed data to the requesting client.

BRIEF DESCRIPTION OF THE DRAWINGS

FIG. 6 shows a user interface (UI) displaying an exemplary PQL query and a corresponding exemplary PQL response. Specifically, the PQL query includes a modifier parameter based on a data polyarchy schema to specify a particular attribute with which to perform a search of a polyarchical data set.

FIG. 7 is a block diagram of a UI displaying an exemplary PQL query and a corresponding exemplary PQL response. Specifically, the PQL query includes a modifier parameter based on an elements-of-interest schema; the parameter specifies a limiting attribute with which to modify a result of a search.

FIG. 11 is a UI showing use of a locating element in an exemplary PQL query with respect to a particular attribute and a subsequent intersection between two corresponding polyarchies of data relationships to form an exemplary PQL response.

DETAILED DESCRIPTION

Overview

Figure 1:
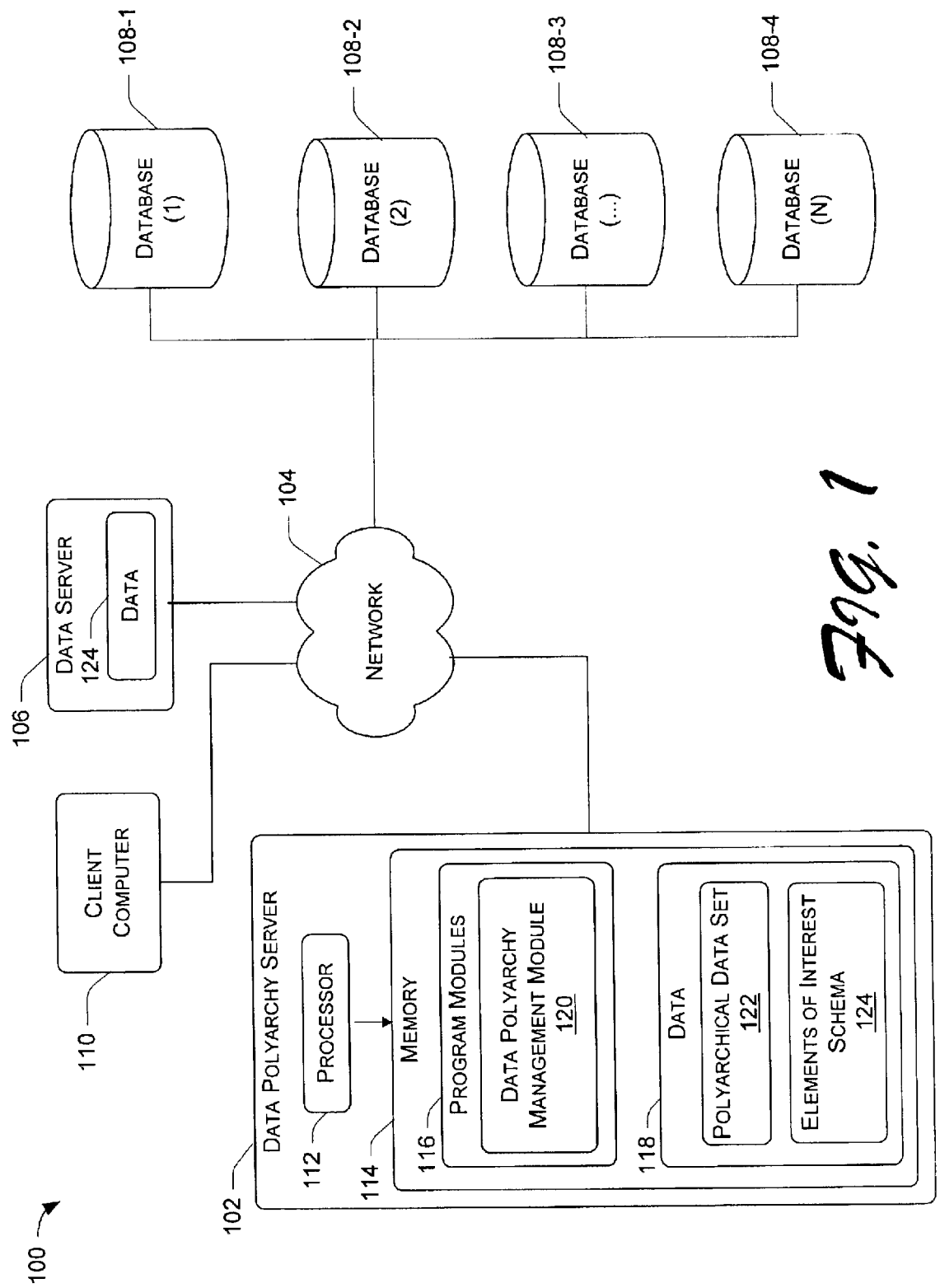
FIG. 1 shows an exemplary system for dynamically generating and managing multiple hierarchies of inter-object relationships based on the values of attributes of the objects.

The following subject matter replaces traditional notions of complex real-world object presentation within a single static hierarchy, wherein directory object naming and inter-object relationships are inter-tangled and unwieldy for representing complex data relationships. More specifically, traditional notions of distinguished names for representing inter-object relationships within a single directory of static inter-object relationships are replaced with graphs of elastic (non-static) inter-object connections in multiple dimensions of data relationships (e.g., mono and/or bi-directional relationships) based on attributes of the objects. In other words, the data relationships establish that one or more data objects participate in one or more respective dimensions, or polyarchies of inter-object relationships. One or more of these hierarchies can intersect creating intersecting hierarchies of inter-object relationships.

Dynamically generated multiple hierarchies of data relationships based on object attributes are represented in a data polyarchy. Specifically, the data polyarchy is generated using each object's respective data attributes or data values and multifarious interrelationships of those values with attributes that correspond to other objects in the polyarchical data set. The inter-object relationships in the data polyarchy can be elastic because inter-object relationships are derived from data defined by an object at any point in time. Patterns of relationships between objects emerge by presenting an object in one or more "dimensions" or polyarchies of data relationships. Such relationships are presented using inter-object connections between virtual entities representing the objects. A virtual entity corresponds to an object of interest and includes and organizes information about an object of interest—including information about how to get more information about the object of interest. Such objects can be presented to people or computer programs that embody that interest.

In contrast to traditional systems and procedures to represent inter-object relationships in a data store, the following described arrangements and procedures are dynamic, in that they are automated and do not require any manual intervention from a network administrator to configure inter-object relationships. By dynamically generating a data polyarchy complex inter-object relationships based on object data are automatically determined without presenting any inflexible design choice to a schema designer.

This means that the network administrator or computer program (e.g., a search engine) is not required to have any a-priori knowledge of complex inter-object relationships to generate, navigate, or search a data store. This also means that each object in a data store can be viewed from as many different dimensional inter-object hierarchies as apply to the respective object. Furthermore, as an object's elastic data relationships change, the data polyarchy automatically detects and reflects those changes.

The following description sets forth arrangements and procedures based on a directory schema for representing polyarchies of inter-object relationships that incorporates elements recited in the appended claims. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System

FIG. 1 shows an exemplary system 100 to dynamically generate and manage multiple hierarchies of inter-object relationships based on the values of attributes of the objects. The system represents a distributed computing environment including a data polyarchy server 102 operatively coupled across a network 104 to one or more other optional data servers 106, one or more databases 108, and one or more client computers 110. The operative coupling of the data polyarchy server to the network can be made in any number of different ways such as through one or more server appliances (eg., a server appliance on the outside of a Web farm-server farm), a corporate portal (intranet), a local area network (LAN), a co-located data store (e.g., a database 108), and so on, The data polyarchy server 102 includes a processor 112 operatively coupled to a memory 114 that includes computer-executable instructions 116 and data 118. The processor is configured to fetch and execute the computer-executable instructions and fetch the data during such execution. Such computer-executable instructions include an operating system (not shown), and a data polyarchy management module 120 to dynamically generate and manage multiple hierarchies of inter-object relationships based on the values of attributes of the objects. These dynamically generated multiple hierarchies of inter-object relationships are stored in the polyarchical data set 122, which is also referred to as the data polyarchy. To generate the data polyarchy 118, the data polyarchy management module 120 uses data (e.g., Extensible Markup Language (XML) data) from any number of different data sources such as from one or more other optional servers 106 and/or databases 108. For instance, a server 106 provides data (e.g., directories of enterprise users, resources, financial information, corporate e-mail systems, network operating systems, etc.) to the data polyarchy server from any number of various data stores—databases, directories, metadirectories, and so on. A database 108 is a structured or unstructured data store, including an object-oriented database such as an XL database, a Hypertext Markup Language (HTML) database, an SQL server database, and so on.

Responsive to generating and managing the data polyarchy 122, the management module 120 respectively generates and updates the elements of interest schema 124. The elements-of-interest schema indicates how an optional client computer 110 can manipulate and display the objects in the data polyarchy with respect to their respective polyarchies of inter-object relationships.

For instance, the elements-of-interest schema 124 identifies each object in the data polyarchy 122 as an address referencing a virtual entity (e.g., see the virtual object 210 of FIG. 2) that represents the respective object. These virtual entities are stored as vectors or arrays of addresses in the schema. Each different type of attribute that an object in the data polyarchy could have is also identified in the schema as well as what kinds of indexes are to be used on the various attribute types. (A data index provides for object access). For each attribute type it is convenient to store with its definition, its corresponding index. In this manner, for example, if somebody requests for an attribute, the index is readily available and all of the values assumed by the attribute can be determined very quickly. (An elements-of-interest schema is described in greater detail below in reference to FIG. 3).

The data polyarchy server 102 can generate any number of schemas 124. Each generated schema can provide access to various subsets of the objects in the data polyarchy 122 independent of the objects represented by other schemas 124. For example, a first schema 124 can be distributed to network administrators to provide access to resources and attributes such as printers and access lists that are otherwise protected or hidden from other employees. In the same manner, a second schema can be distributed to the president of human resources. While the second schema may provide the president with access to certain privileged employee records, the second schema could be completely silent with respect to the resources that are available to the network administrators group via the first schema. In this manner, schemas 124 can be designed to provide access control to organizational resources.

The data polyarchy server 102 communicates the elements-of-interest schema 124 to one or more optional clients 110. The client computer supports a graphical user interface (not shown) for displaying inter-object relationships in the data polyarchy 122 as described by the elements of interest schema. Exemplary arrangements and procedures to display objects within polyarchies of data relationships are described in related U.S. patent application Ser. No. 09/728,935, titled "Hierarchy Polyarchy Visualization", filed on Nov. 29, 2000, which is assigned to the assignee hereof, and which is incorporated by reference.

The data polyarchy 122 and the elements of interest schema 124 can be replicated one or more times in a memory cache 114 by the data polyarchy server 102. An exemplary memory cache is described in greater detail below in reference to FIG. 14. Since the polyarchical server can operate either data set from a corresponding memory cache, there can be as many copies of the respective data sets as necessary. Thus no matter how demanding a client 110, the data polyarchy server can satisfy the demand.

When data polyarchy 122 and the elements of interest schema 124 are replicated in a memory cache 114 by the data polyarchy server 102, the server can maintain an authoritative store (not shown) in the memory 114 to represent the most recent, or current representation of the inter-object relationships. Such an authoritative store is beneficial because caches by their very nature are always out of date to some degree—meaning that data in a cache is only as "fresh", or timely as the most recent cache update. In light of this, a client requesting information from the data polyarchy 122 can indicate the level of data reliability or timeliness required by the client. If a high timeliness is required, the server 102 can access the data polyarchy from the authoritative store, rather than from more out of data caches. The speed of access to an authoritative cache depends on its respective implementation (e.g., implemented in internally to the server in random access memory or externally to the server in a data storage device).

Exemplary Data Polyarchy

Figure 2:
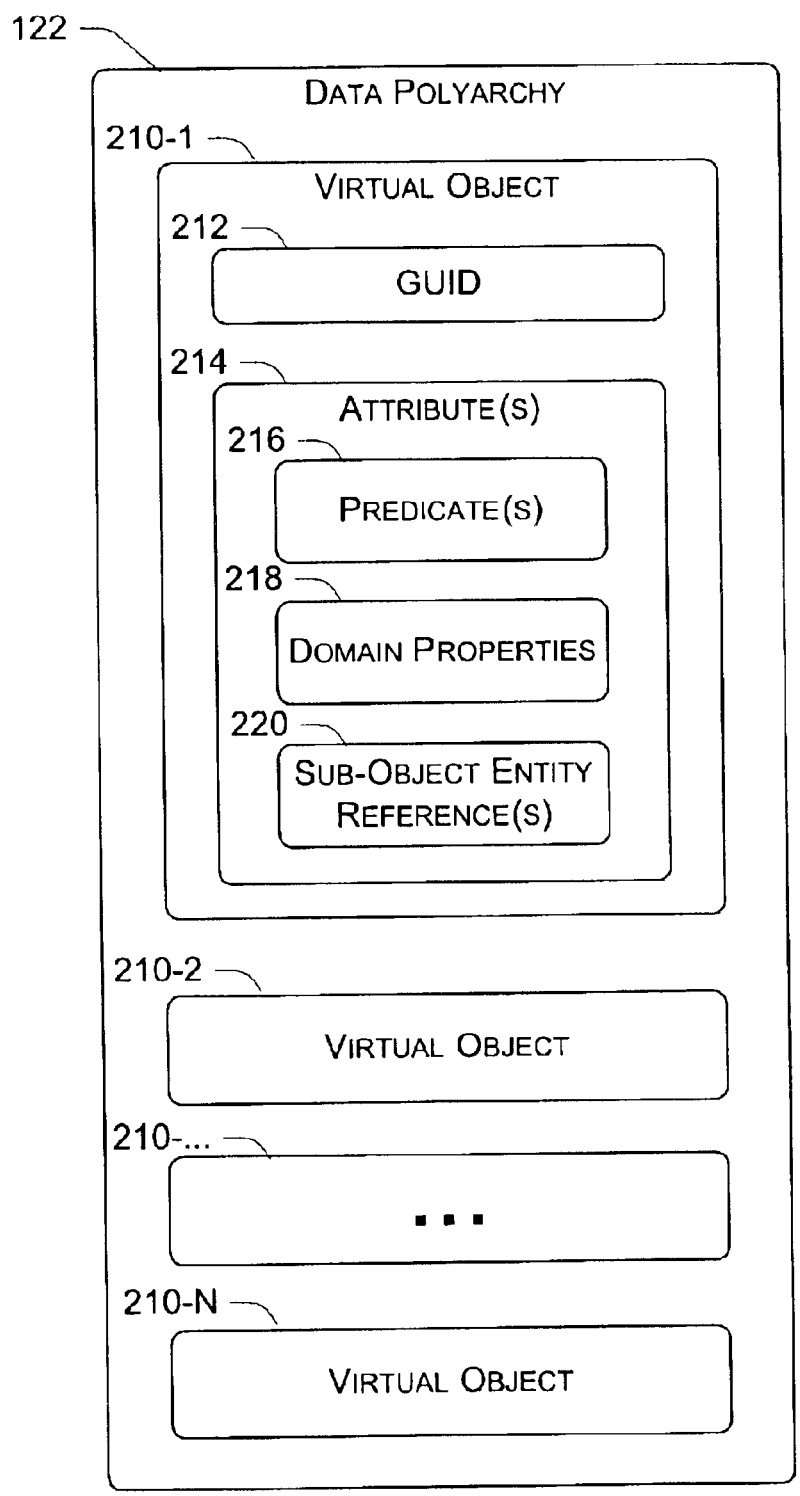
FIG. 2 illustrates an exemplary polyarchy data structure to represent multiple hierarchies of dynamically generated inter-object relationships that are based on the values of attributes of the objects.

FIG. 2 shows an exemplary polyarchical data set 122 to represent multiple dimensions of inter-object relationships based on attributes within the data. The data is anything that can be differentiated (e.g., anything that is an object of interest represented in a directory, database, etc., can be an object). The data set 122 is formatted to allow designers to create their own customized tags, enabling the definition, transmission, validation, and interpretation of data between applications and between organizations. For example, the data format can be an XML data format.

The data polyarchy 122 includes multiple virtual object data fields 210. Each virtual object data field includes and organizes information about a respective object, including, for example, information about how to get more information about the respective object. Specifically, the virtual object includes a globally unique identifier (GUID) data field 212 and if appropriate for the particular object, one or more attribute data fields 214.

A GUID 212 uniquely identifies the virtual object (which in turn represents a respective object) with respect to this or any other object in this or any other data polyarchy 122. As already noted, these objects can be represented in one or more physically distributed data stores that are in turn logically centralized by one or more directory services as well as by one or more data polyarchies. The attribute data field 214 defines any data attributes or data values of the virtual object 210. Each attribute corresponds to the attributes that an actual instance of the virtual object may include. Such attributes include, for example, one or more predicate data fields 216, multiple domain property data fields 218, and zero or more sub-object entity references 220.

Each predicate data field 216 indicates a respective operation to access or present a particular object with respect to one or more hierarchies of other objects (each object being represented by virtual objects 210 in the polyarchical data set 122). Such operations indicate one or more diverse types of searches (e.g., a linear search and a recursive search), data transformations (e.g., from one hierarchical relationship to another different hierarchical relationship), and so on. (See, block 1318 of FIG. 13).

If an object is a simple object, meaning that it does not reference to a sub-object entity 220, a predicate 216 operation (e.g., a search, modification, data transformation—from one structure such as from a virtual object 210 to an object within a hierarchy of other objects) will correspond to the respective object of interest. However, if the object is a complex object, meaning that it has a data relationship to one or more sub-objects, then the predicate operation will correspond toga combination of the object and/or the one or more sub-objects.

The domain property data field 218 includes a physical domain property and a logical domain property. The physical domain property indicates one or more sets of values used to index a data object. The physical domain property is selected from a group of physical domain properties including a data type, a data precision indication, a scale indication, and a nullability indication). The logical domain property aspect of the domain property 218 facilitates searching and navigation of the data polyarchy 122 by allowing object data values to be assigned to particular domains, Specifically, the logical domain indicates a strategy to access and/or present the corresponding object with respect to the other objects in the data polyarchy. For instance, the logical domain property includes a unique domain property, a locating domain property, and a classifying domain property. The particular one logical domain property that the polyarchical data relationship management module 116 assigns to an attribute of an object is based on the attribute's relative distribution of its value in the data polyarchy with respect to other values of the same attribute of other objects in the data polyarchy.

We now describe: (a) the relative distribution of the values assumed by an attribute within the data polyarchy 122; and (b) how data distribution determines which objects represent respective dimensions (hierarchies), upnodes, and down nodes.

Relative Attribute Value Distribution

The set of values that an attribute has is part of that attribute's logical domain. Any information that is collected about the actual distribution of the values (in terms of the number of potential objects that contain each potential value) in a data polyarchy 111 is also a property of the attribute's logical domain. To determine the relative distribution of attribute values, one or more thresholds (e.g., a low threshold and a high threshold) are defined to determine the attribute's relative distribution in a data polyarchy 122 with respect to other attributes of other objects in the polyarchy. The thresholds are based on the assumption that the data may have a certain percentage of error within it (e.g., one (1) percent error), (Other statistical analysis techniques can be used in combination with or in place of the thresholds to determine object attribute distributions).

For instance, as objects are loaded into the data polyarchy 122 (e.g., from one or more directory and/or database servers 106), the data polyarchy management module 120 examines each object's respective attributes values based on the thresholds to determine: (a) which attributes are substantially unique with respect to their distributions in objects in the data set; (b) which attributes are distributed across a substantially large set of objects; and (c) which attributes are distributed across a substantially small set of objects in the data set. These determinations are made based on assuming that the data has that certain percentage of error.

With this assumption of some data error in mind, consider that a substantially unique attribute is not necessarily the only attribute of its kind in the data polyarchy 122. Rather, an attribute may be absolutely unique, or the attribute may belong to a relatively sparse distribution of similar attributes in the data set. Attributes that are determined to be substantially unique with respect to their distributions across objects in the data set have a unique logical domain property illustrating that they are distinguishing as compared to other attributes.

Attributes that are distinguishing may identify respective unique dimensions in the polyarchical data set 122, which are represented as up-nodes of an interconnected graph that in turn represents a hierarchical dimension. Inside this model, the default polyarchy is flat. Attributes that are not distinguishing are distributed either across a substantially large set of objects in the data set, or alternatively distributed across a substantially small set of objects. Non-distinguishing attributes are not good candidates for attributes that define dimensions. Instead, such distributions indicate that non-distinguishing attributes belong to one or more of the identified dimensions. Accordingly, a non-distinguishing attribute is represented as a down-node in at least one dimension that is identified by the attributes distribution. Up-node polyarchies are also discovered when all the values of a down-node object are located in a substantially unique up-node object.

Attributes that are distributed across a substantially large set of objects have a locating domain property (e.g., a surname may be a locating domain property). Attributes with locating domain properties are used to narrow a search for particular ones of the data objects in the data polyarchy 122. Attributes that are distributed across a substantially small set of objects have a classifying domain property. Attributes with the classifying domain property are used to filter out unwanted objects from a search or navigation procedure.

Jump Gates

A sub-object entity reference 220 such as a GUID not only indicates whether a virtual object 210 (i.e., a respective object) has a relationship to a different object in the data polyarchy 122, but it also references the different object (i.e., via the different object's corresponding virtual object). Specifically, a sub-object reference uniquely identifies the different object of interest as a sub-object of the virtual object data field. The sub-object reference uniquely identifies the different object of interest across one or more data stores.

A virtual object 210 that references a sub-object (via a corresponding sub-object entity reference 220) is a "jump gate". A jump gate represents an elastic data relationship between a complex object and related sub-objects within the polyarchical data set 122. Inter-object data relationships in the data polyarchy are modeled with one or more simple objects 210 and/or complex objects 210. If an object has one or more sub-data relationships, such relationships are either represented as referenced sub-objects 220 in the object (or "surface entity"), or as separate objects 210 linked to another object 210 in some dimension.

To illustrate this, consider that an employee and the employee's dependents are people represented as objects in a directory store. The data store administrators may want to maintain fine-grained information about various aspects of each. To represent sub-world information (about the dependents) in the surface entity (the employee), one can use the following representation shown in TABLE 1.

TABLE 1

EXAMPLE OF STORING SUB-WORLD INFORMATION IN A SINGLE SURFACE ENTITY

```
<person type="employee" GlueID="13399">
    <name> John Doe </name>
    <age> 31 </age>
    <sex> male </sex>
    <dependents>
        <person type= "spouse">
            <name> Alice Doe </name>
            <age> 31 </age>
            <sex> female </sex>
        </person>
        <person type= "child">
            <name> Sigmund Doe </name>
            <age> 8 </age>
            <sex> male </sex>
        </person>
    </dependents>
    <occupation> forester </occupation>
</person>
```

To represent sub-world information about the dependents in totally distinct entities, Alice Doe and Sigmund Doe would be split off into separate entities, having their own Glue IDs (GUIDs 212), as illustrated, for example, in TABLE 2.

TABLE 2

EXAMPLE OF SEPARATE OBJECT/ENTITY REPRESENTATIONS

```
<person type= "spouse" GlueID= "24889">
    <relatedEmployee> 13399 </relatedEmployee>
    <name> Alice Doe </name>
    <age> 31 </age>
    <sex> female </sex>
</person>
<person type= "child" GlueID="24890">
    <relatedEmployee> 13399 </relatedEmployee>
```

TABLE 2-continued

EXAMPLE OF SEPARATE OBJECT/ENTITY REPRESENTATIONS

```
        <name> Sigmund Doe </name>
        <age> 8 </age>
        <sex> male </sex>
    </person>
```

Note that the "person" elements are identical whether they exist as sub elements in John's virtual entity or as root elements in their own independent virtual entities. In this context, John Doe's entity can be reduced as illustrated in TABLE 3.

TABLE 3

EXAMPLE OF A SINGLE ENTITY REPRESENTATION

```
<person type="employee" GlueID="13399">
    <name> John Doe </name>
    <age> 31 </age>
    <sex> male </sex>
    <occupation> forester </occupation>
</person>
```

The entity illustrated in TABLE 2 is related to John's dependents along the "dependents" dimension, where "relatedEmployee" is joined to Glue ID to "pass through the jump gate".

Between these two extremes, we can imagine representing John's node internally as illustrated in TABLE 4.

TABLE 4

EXAMPLE OF AN ENTITY REFERENCING ONE OR MORE OTHER ENTITIES

```
<person type="employee" GlueID="13399">
    <name> John Doe </name>
    <age> 31 </age>
    <sex> male </sex>
    <dependents>
        <person GlueID= "24889"/>
        <person GlueID= "24890"/>
    </dependents>
    <occupation> forester </occupation>
</person>
```

The entity of TABLE 4 could be returned to a client as is allowing the client to add to this information by expanding the related Glue IDs. Or a server such as a data polyarchy server 102 of FIG. 1 could itself de-reference the Glue IDs, returning the following amalgam (shown below in TABLE 5), and demonstrating the elasticity of the solution to the jump gate problem evident in traditional directory implementations.

TABLE 5

EXAMPLE OF DE-REFERENCED IDENTITY INFORMATION

```
<person type="employee" GlueID="13399">
    <name> John Doe </name>
    <age> 31 </age>
    <sex> male </sex>
    <dependents>
        <person type= "spouse" GlueID= "24889">
            <name> Alice Doe </name>
            <age> 31 </age>
            <sex> female </sex>
        </person>
```

TABLE 5-continued

EXAMPLE OF DE-REFERENCED IDENTITY INFORMATION

```
        <person type= "child" GlueID= "24890">
            <name> Sigmund Doe </name>
            <age> 8 </age>
            <sex> male </sex>
        </person>
    </dependents>
    <occupation> archeologist </occupation>
</person>
```

In other words, a virtual object 210 can be modeled as either: (a) a simple object (often referred to as a "simple element") such as a character string, an integer, and so on, that does not reference any other element; or.(b) a complex object (often referred to as a "complex element") that references one or more other simple elements or complex elements. In this manner, the polyarchical data set 122 provides for elastic inter-object data relationships that can be defined at any time with any one of a number of different relational representations.

Thus, in sharp contrast to traditional rigid directory implementations that have an intractable schema problem, wherein semantics of shape and naming in a directory must be agreed on in advance to solve the simplest design problem, no fundamental design decision is required when encountering an inter-object data relationship that is modeled as a jump gate. The shape and naming of the directory tree based on the polyarchical data set 122 is not affected by representing various and elastic inter-object relationships even after a polyarchical data set has been designed. Moreover, an update/modification to a complex object may also result in corresponding updates to one or more related sub-objects that in turn may be represented in one or more different dimensions as compared to a particular dimension that represents the complex object.

Optimizing the Data Polyarchy Schema for De-referenced Operations

Two or more objects can be related to a third object for de-referenced dimensional group, or many-to-many object searching and navigation operations. For example, membership in a group is represented by a membership entity containing information about the relationship between a member and a group. A membership entity includes a memberOf data field to identify a group, and a memberIs data field to identify a group member. In this implementation such unique identification is accomplished by using respective GUIDs 212.

To determine if an entity is a member of a group, we search for a relationship entity where memberIs is the GUID of the entity, and memberOf is the GUID of the group. A membership dimension is defined as shown in TABLE 6,

TABLE 6

EXAMPLE OF A MEMBERSHIP DIMENSION IN SCHEMA

```
<dimension dereferenceElement="memberIs">
    <name> membership </name>
    <displayName lang="en"> Membership </displayName>
    <upnodeReferenceElement> memberOf </upnodeReferenceElement>
    <upnodeNamingElement> GlueID </upnodeNamingElement>
</dimension>
```

In this example, the group's GUID (represented in TABLE 6 as "GlueID") identifies the group as an upnode because the GUID is substantially unique, and the children are identified as membership entities with a memberOf element set to the group's GUID. A conventional "down" navigation through the data set enumerates the membership entities—which may provide useful information about the nature of each individual membership (e.g. when a particular membership expires).

It is also possible to perform an "indirect" enumeration using the memberIs association to get information about the actual group members. To do so, issue a "down" enumeration on the group in the membership dimension with de-referencing set to memberIs. In this case, the membership entity's memberIs element is used to de-reference the actual entity belonging to the group. Thus, it is simple to construct an inverse dimension that list all groups belonged to by an entity. In this case, one may also either list the membership entities, or de-reference them to get information about the groups themselves.

Accordingly, no special schema design is required to represent a group's inverse polyarchies or other many-to-many inter-object relationships in the elements-of-interest schema 124.

An Exemplary Data Polyarchy Schema

Figure 3:
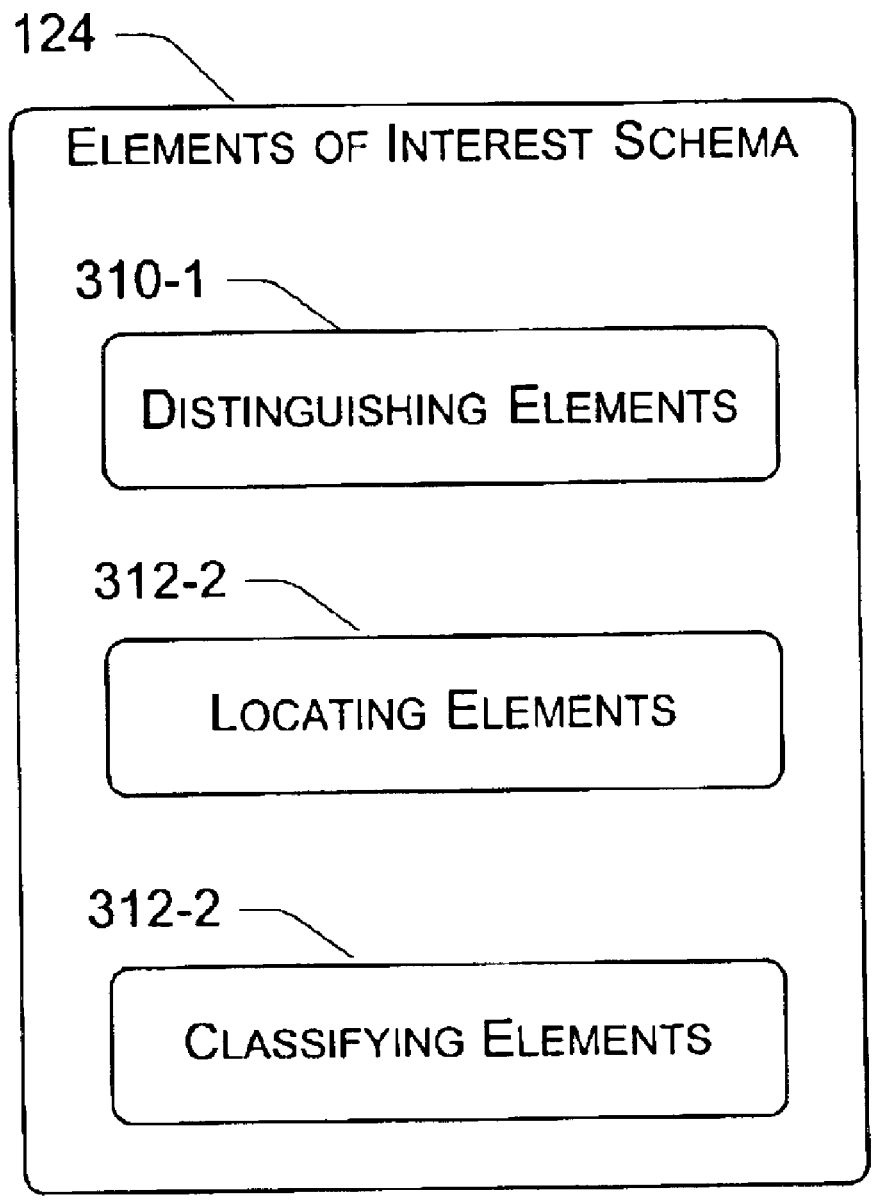
FIG. 3 shows an exemplary schema data structure to indicate how a data polyarchy of FIG. 2 can be created, accessed, and manipulated in a meaningful manner.

FIG. 3 shows further aspects of an exemplary data polyarchy schema 124 of FIG. 1 to indicate how a client can manipulate the data polyarchy 122 in a meaningful manner, The data polyarchy schema is also referred to as an "elements-of-interest" schema. An element is an object attribute or data value. The elements-of-interest schema 124 includes a plurality of data fields 310 to limit a client 110 query on the data polyarchy. Such a query is communicated to the data polyarchy server 102 of FIG. 1. More specifically, such a query is communicated to the polyarchy data management module 120 for processing. The query is limited to at least one subset of objects represented by the schema 124.

The elements 310 are not the objects themselves, but rather object representations (i.e., virtual objects 210 of FIG. 2) that indicate the relative scope of object data with respect to its distribution in the data polyarchy 122. As noted above, these virtual entities are stored as vectors or arrays of addresses in the schema.

Each different type of attribute 214 that an object 210 in the data polyarchy 122 could have is also identified in the schema as well as what kinds of indexes are to be used on the various attribute types.

The elements 310 (i.e., index types) are selected based on the relative distribution of the values assumed by an attribute within the data polyarchy 122. (The relative distribution of the values assumed by an attribute was discussed above in reference to FIG. 2). The elements 310 include at least one subset of the logical domain properties corresponding to all of the objects in the data polyarchy 122. (Logical domain properties are discussed above in reference to FIG. 2). The elements 310 represent attributes that have a substantially unique or "distinguishing" logical property index type, a locating, logical property index type, and/or a classifying logical property index type. Accordingly, the elements 310 include distinguishing elements 310-1, locating elements 310-2, and classifying elements 310-3.

A distinguishing element 310-1 (i.e., distinguishing index type) is a good candidate for a dimensional relationship between attributes in the data polyarchy 122 and is represented, for example, by a unique object (i.e., an object that has an attribute that is indexed by the distinguishing element) representing an up-node in a dimension or hierarchy (e.g., a GUID, a location, an employee number, a cost center, and so on). The locating index type 310-3 or selecting index type is a good candidate for locating objects within the data polyarchy and is represented, for example, by the following attributes: a surname, a building name, a title, a room number, and/or the like. An attribute having a classifying index type such as an indication of gender (e.g., male or female) is a good candidate to filter objects in a search of objects in the data set because classifying objects are relatively small in number in the data polyarchy as compared to the relative distribution of objects with attributes that correspond to other index types.

The elements-of-interest schema 124 is highly customizable. For instance, a network administrator can assign natural language names such as names in English, French, Chinese, etc., to the elements, or objects in the elements-of-interest data set 124. Moreover, the administrator can designate sub-objects for storage as linked but discreet entities, as described in greater detail with respect to jump gates and TABLES 1 through 4. In this manner, objects in the polyarchical data set 122 of FIGS. 1 and 2 that would not otherwise be immediately subordinate to a root object become eligible for promotion in the schema, This mechanism is used in conjunction with multiple dimensions (polyarchy) to produce elastic jump gates.

TABLE 7 shows an exemplary elements-of-interest schema 124 in an XML data format. Other data format representations besides XML representations (e.g., an extended version of XML, which has at least a subset or more of the features of XML) of elements 310 are contemplated. In this schema representation, boxed text (i.e., text boxed-in or surrounded with lines) and text preceded by a semi-colon ";" represent corresponding comments. Generally comments of more than a single line are placed in a box.

TABLE 7

EXAMPLE ELEMENTS OF INTEREST SCHEMA

<WellKnownEntities GlueID="d7a5fla9-6ba9-48a2-a464-660d82c24b5c">

; The "WellKnownEntities GlueID" tag is a unique schema ID.

<ElementsOfInterest>   ; the beginning of the schema

<element name="objectType">   ; name of the attribute

<displayName lang="en" value="Object Type"/>

TABLE 7-continued

EXAMPLE ELEMENTS OF INTEREST SCHEMA

> The "displayname lang" tag indicates a language ("lang") such as English ("en") and the corresponding value of the attribute in the language (e.g., cn's English display name is "Name"). As can be appreciated, the schema can be configured by a network administrator to indicate a number of different display names even for a single attribute (e.g., an English display name, French display name, Chinese display name, and so on).

```
      </element>
            <element name="GlueID" indexType="Distinguishing">
```

> ;Note that the "GlueID" element is identified as a "distinguishing" attribute. Other indexTypes include locating, or classifying index types. Each index type is based on the attributes relative distribution in the data polyarchy

```
            <displayName lang="en" value="Glue ID"/>
      </element>
            <element name="cn">
             <displayName lang="en" value="Name"/>
      </element>
            <element name="telephoneNumber">
             <displayName lang="en" value="Phone Number"/>
      </element>
            <element name="roomNumber">
             <displayName lang="en" value="Room Number"/>
      </element>
            <element name="uid">
             <displayName lang="en" value="E-mail Alias"/>
      </element>
            <element name="description">
             <displayName lang="en" value="Description"/>
      </element>
                        <element name="sn" indexType="selecting"
            <displayName lang="en" value="Surname"/>
      </element>
            <element         name="givenName"           indexType="locating"
startingSize="20000">
            <displayName lang="en" value="Given Name"/>
      </element>
            <element         name="mail"        indexType="distinguishing"
indexStartingSize="20000" indexGrowBy="20000">
            <displayName lang="en" value="E-mail Address"/>
      </element>
            <element name="buildingName" indexType="classifying">
             <displayName lang="en" value="Building Name"/>
      </element>
            <element name="title" indexType="classifying">
             <displayName lang="en" value="Title"/>
      </element>
            <element name="location" indexType="distinguishing">
             <displayName lang="en" value="Location"/>
      </element>
            <element name="locationUpnode"/>
            <element name="uniqueIdentifier" indexType="distinguishing">
             <displayName lang="en" value="Employee Number"/>
      </element>
            <element name="manager">
             <displayName lang="en" value="Manager"/>
      </element>
            <element name="costCenter" indexType="distinguishing">
             <displayName lang="en" value="Cost Center"/>
      </element>
            <element name="costCenterUpnode"/>
      </ElementsOfInterest>
      <Dimensions>
```

TABLE 7-continued

EXAMPLE ELEMENTS OF INTEREST SCHEMA

> The "Dimensions" tag is a portion of the schema that identifies those objects in the data polyarchy 122; that represent a root node in a hierarchy of data relationships.

```
<dimension>         ; indicates a dimension
    <name>costCenter</name>          ; name of the dimension
<upnodeReferenceElement>costCenterUpnode</upnodeReferenceElement>
```

> The "upnodeReferenceElement" tag represents - the element that contains the value that is present in the parent dimension naming element.

```
<dimensionNamingElement>costCenter</dimensionNaming
Element>
```

> The "dimensionNamingElement" tag names the objects in that dimension.

```
<view>
```

> The "view" tag can indicate that objects above or below the dimension can be shown (e.g., siblings).

```
<displayName lang="en">Business Units</displayName>
    <SearchType>nodeQuery</SearchType>
```

> The "SearchType" tag indicates how the client should generate the query. If absent, the client will generate a query that returns a simple list. If "nodeQuery", the generated query will request a hierarchy result in the specified dimension. If "nodeConstraintQuery", the generated query will request a hierarchy constrained to only entities below the specified entity in the specified dimension. If "nodeExclusiveQuery", the generated query will request a hierarchy constrained to be below the first specified entity and not below the second and succeeding specified entities in the specified dimension.

```
<up>*</up>
```

> The "up" tag the number of hierarchy levels (i.e., ancestors in the hierarchy) that are to be displayed in the dimension. In this case, the wild card "*" indicates that all levels in this dimension can be viewed.

```
<ElementsList>
```

> These attributes indicate those that will be displayed at this level. This list is customizable.

```
            <element>cn</element>
            <element>uid</element>
            <element>telephoneNumber</element>
            <element>title</element>
            <element>buildingName</element>
            <element>roomNumber</element>
            <element>description</element>
            <element>companyCode</element>
            <element>costCenter</element>
        </ElementsList>           </view>
    </dimension>
    <dimension>
        <name>Management</name>
<upnodeReferenceElement>manager</upnodeReferenceElement>
```

TABLE 7-continued

EXAMPLE ELEMENTS OF INTEREST SCHEMA

```
<dimensionNamingElement>uniqueIdentifier</dimensionNamingElement>
        <view>
            <displayNamelang="en">Management</displayName>
            <displayName lang="fr">Gestion</displayName>
            <SearchType>nodeQuery</SearchType>
            <up>*</up>
            <ElementsList>
                <element>cn</element>
                <element>uid</element>
                <element>telephoneNumber</element>
                <element>title</element>
                <element>buildingName</element>
                <element>roomNumber</element>
            </ElementsList>
            <selected>true</selected>
```
The "selected" tag indicates to the client that this view is the default (selected) view in the client interface.
```
        </view>
        <view>
            <displayName              lang="en">Direct
Reports</displayName>
            <SearchType>nodeQuery</SearchType>
            <up>0</up>
```

> The "<up>0</up>" tag is a dimensional direction indicator that indicates to the client that no hierarchy ancestors of the specified entity should be returned in the specified dimension.

```
            <down>1</down>
```

> The "<down>1</down>" tag is a dimensional direction indicator that indicates to the client that only the immediate descendants (one level of the hierarchy) of the specified entity should be returned in the specified dimension.

```
            <ElementsList>
                <element>cn</element>
                <element>uid</element>
                <element>telephoneNumber</element>
                <element>title</element>
                <element>buildingName</element>
                <element>roomNumber</element>
            </ElementsList>
        </view>
        <view>
            <displayName              lang="en">Related
People</displayName>
            <SearchType>nodeQuery</SearchType>
            <up>*</up>
            <down>1</down>
            <siblings>true</siblings>
```

> The SIBLINGS='true' tag indicates that all objects with the same parent as the current object should be returned. The <up>, <down>, and <siblings> tags are not generated by any automatic analysis. They are carefully designed by a metaverse designer to enable a client to provide useful views to a user.

```
            <ElementsList>
                <element>cn</element>
                <element>uid</element>
                <element>telephoneNumber</element>
                <element>title</element>
                <element>buildingName</element>
                <element>roomNumber</element>
            </ElementsList>
        </view>
        <view>
            <displayName     lang="en">Same     Title
```

TABLE 7-continued

EXAMPLE ELEMENTS OF INTEREST SCHEMA

```
(in context)</displayName>
                <SearchType>nodeQuery</SearchType>
                <up>*</up>
                <SearchElement>title</SearchElement>
```

> The "SearchElement" tag indicates to the client which element of interest should be queried on the selected entity. For example, if Jane Doe is selected and a "title" searchElement is specified, then the client will determine what Jane Doe's title is and do a search of all people with that title.

```
                <ElementsList>
                    <element>cn</element>
                    <element>uid</element>
                    <element>telephoneNumber</element>
                    <element>title</element>
                    <element>buildingName</element>
                    <element>roomNumber</element>
                </ElementsList>
            </view>
            <view>
              <displayName lang="en">Same Title (list)</displayName>
                <SearchType>nodeSearch</SearchType>
                <SearchElement>title</SearchElement>
                <ElementsList>
                    <element>cn</element>
                    <element>uid</element>
                    <element>telephoneNumber</element>
                    <element>title</element>
                    <element>buildingName</element>
                    <element>roomNumber</element>
                </ElementsList>
            </view>
        </dimension>
        <dimension>
            <name>officeLocation</name>
    <upnodeReferenceElement>locationUpnode</upnodeReferenceElement>
    <dimensionNamingElement>location</dimensionNamingElement>
            <view>
                <displayName           lang="en">Location    of
Office</displayName>
                <SearchType>nodeQuery</SearchType>
                <up>*</up>
                <ElementsList>
                    <element>cn</element>
                    <element>uid</element>
                    <element>telephoneNumber</element>
                    <element>title</element>
                    <element>buildingName</element>
                    <element>roomNumber</element>
                    <element>description</element>
                </ElementsList>
            </view>
        </dimension>
    </Dimensions>
    <Inputs>
```

> The "Inputs" tag indicates to the Polyarchy data manager where the source material is located and what element should be used as the anchor for that material.

```
    <Input name="base" path="input.xml" anchor="GlueID"/>
    </Inputs>
</WellKnownEntities>
```

Exemplary Procedure to Dynamically Generate a Data Polyarchy

Figure 4:
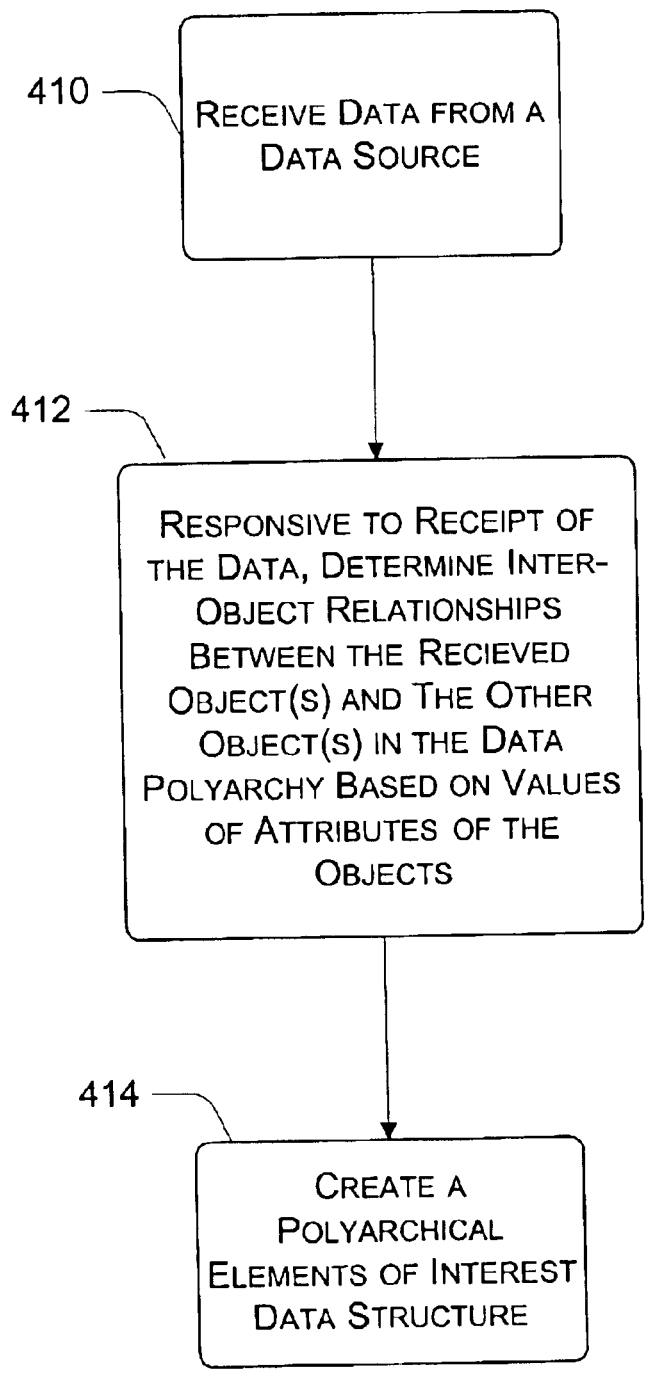
FIG. 4 shows an exemplary procedure to generate multiple hierarchies of inter-object relationships based on the values of attributes of the objects.

FIG. 4 illustrates an exemplary procedure 400 to generate multiple hierarchies of inter-object relationships based on the values of attributes of the objects. The data polyarchy 122 includes multiple objects. The procedure may be implemented in software as computer-executable instructions stored in a computer-readable medium such that when executed by a processor that is operatively coupled to the medium, the instructions perform the operations described in the blocks of FIG. 4.

At block 410, the data polyarchy server 102 of FIG. 1 receives data from any number of data sources such as from a conventional directory service based on X-500 and LDAP, metadirectory service, a database, and so on. The data is received in any one of a number of different data formats such as the XML data format. The server 102 communicates the received data to the data polyarchy management module 120 of FIG. 1.

At block 412, responsive to receiving the data (block 410), the data polyarchy management module 120 generates or updates the data polyarchy 122 to reflect any inter-object relationships (e.g., mono-directional and/or bi-directional relationships) between the received data and the data (if any) already in the polyarchy 122. As already discussed, these inter-object relationships are determined based on the attributes of the received data with respect to the attributes of the other objects in the polyarchy. Specifically, to generate, configure, or update the data polyarchy, the management module analyzes the relative distributions of the attributes of the objects in the data polyarchy to determine which of zero, one, or more dimensions within which each object participates in inter-object relationships with other objects in the polyarchy.

These operations 412 are automatic or dynamic responsive to receipt of the data (block 410) and do not require any intervention of any human operators such as network administrators. Because inter-object relationships in the data polyarchy 122 are determined and expressed based on the values of attributes of the objects in the polyarchy, these inter-object data relationships can be elastic—meaning that they can change over time. As values of attributes change, the inter-object relationships based in the new values are dynamically or automatically represented in the polyarchy by the management module 120 upon receipt. These operations 412 are performed independent of a-priori knowledge of data relationships between respective ones of the data objects in the data polyarchy. Additionally, because inter-object relationships in the data polyarchy are determined and expressed based on the values of attributes of the objects in the polyarchy, these relationships are determined and expressed completely independent of a distinguished name of an object.

At block 414, the data polyarchy management module 120 of FIG. 1 generates, configures, or updates the elements-of-interest schema 124 (e.g., see FIGS. 1 and 3) to indicate how the data polyarchy 122 can be manipulated, presented, and navigated in a meaningful manner. Specifically, as discussed above in reference to FIGS. 2 and 3, and Table 7, the schema indicates the elements, or attributes in the data polyarchy along with any corresponding distinguishing, locating, or classifying characteristics of each attribute. The schema also indicates the dimensions in the polyarchy along with each attribute or element of interest contained by objects in the dimension.

An exemplary set of polyarchical query language (PQL) commands (based on the elements-of-interest schema 124) used by a browser to search, navigate, or display portions of the polyarchical data set 122 are described in greater detail below in reference to FIGS. 6 through 12. An exemplary procedure to use the elements-of-interest schema 124 to formulate PQL requests and responses is described in greater detail below in reference to FIG. 13.

Exemplary Polyarchical Query Language Request

Figure 5:
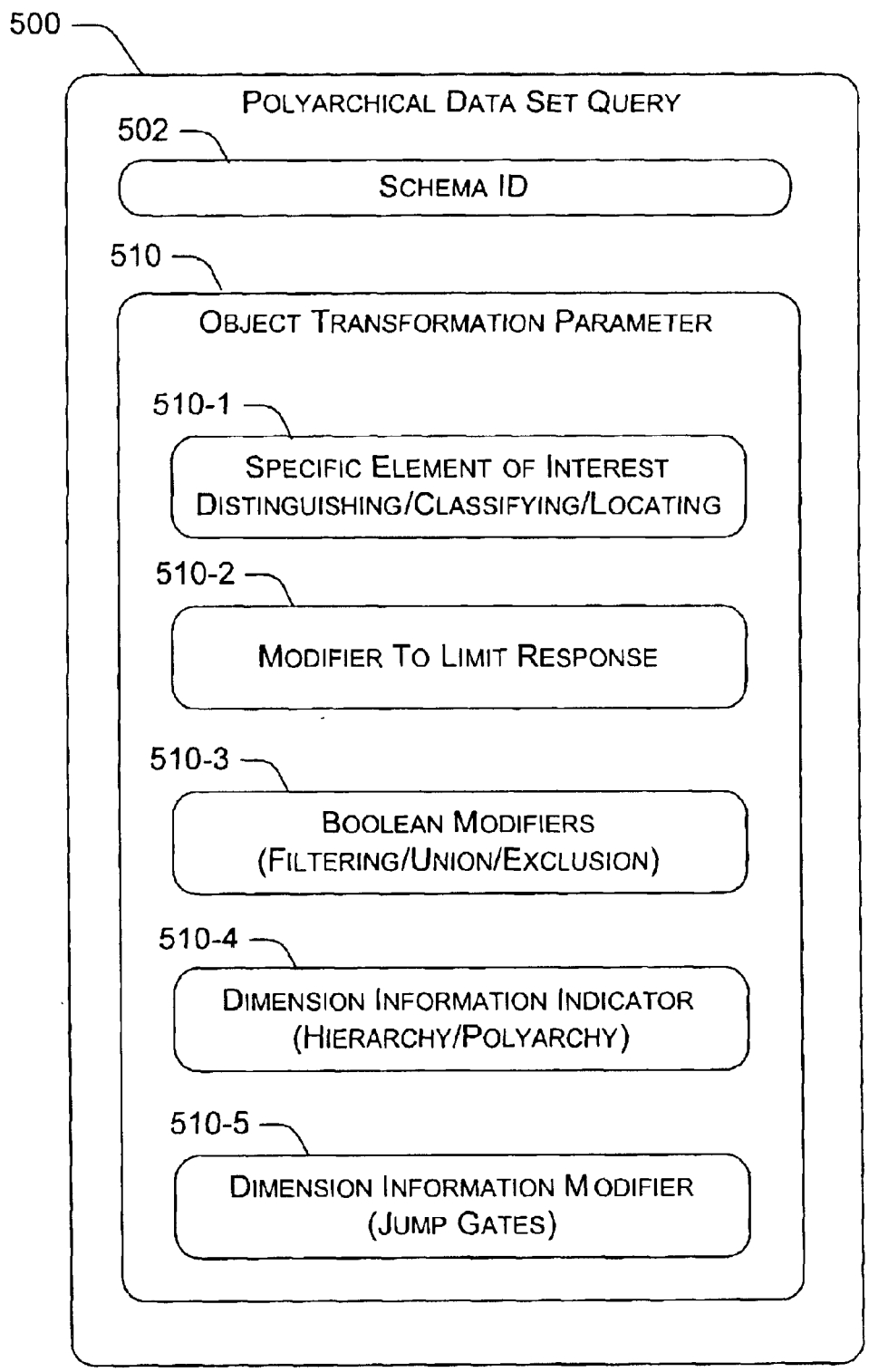
FIG. 5 shows an exemplary polyarchical query language (PQL) request used by a client to request a server to return information (a PQL response) from a data polyarchy.

FIG. 5 shows an exemplary polyarchical query language (PQL) query used by a client 110 to request a data polyarchy server 102 to return information (a PQL response) corresponding to information in the data polyarchy. . Responsive to receiving such a query, the data polyarchy management module 120 identifies and retrieves a set of information corresponding to objects in the polyarchy Queries 500 and corresponding server 102 responses are implemented using a text markup language such as XML. In this configuration, the queries and server responses are packaged in a Simple Object Access Protocol (SOAP) and posted over the network 104 of FIG. 1 using the Hypertext Transfer Protocol (HTTP). SOAP and HTTP are communication protocols that are well known to those skilled in the art of network communication protocols.

The message 500 includes a schema ID 502 and one or more object transformation parameters 510 (hereinafter, a parameter is also referred to as a data field) for specifying one or more attributes 214 of FIG. 2. The schema ID is used to identify a particular elements-of-interest schema 124. It can be appreciated that this data field is optional if there is a default schema or only one schema. The attributes 510 correspond to the virtual objects 210 of the data polyarchy 122. (The attribute(s) include distinguishing attributes, locating attributes, or classifying attributes, each of which is discussed in greater detail above with respect to logical domain properties of FIG. 2).

A parameter 510, or data field is classified according to its type, which is selected from types that include a specific element of interest type 510-1; an elements-of-interest modifier to limit a response 510-2; a Boolean modifier 510-3; a dimension indicator 510-4; and/or a dimension information modifier 510-5. The number and types of data fields that are represented in the message 500 are based on the message's design, or purpose.

FIG. 6 shows a user interface (UI) 600 displaying an exemplary PQL query 500 message and a corresponding exemplary PQL response 620. Specifically, the PQL query includes a modifier parameter 510-1 based on a data polyarchy schema 124 to specify a particular attribute 510 with which to perform a search of the data polyarchy 122. The UI includes a first area 610 to type in a PQL message 500, a second area 612 to show the PQL message packaged in a SOAP envelope 618 and posted over HTTP, and a third area 614 to show the data polyarchy management module 120 PQL response 620. Although the PQL response is shown as being returned in a SOAP envelope, the response can be returned in a variety of other data packaging formats.

In this example, the specific element of interest parameter 510-1 specifies a surname attribute "Doe". The PQL response 620 returned at least two objects and corresponding elements of interest. A respective Glue ID identifies each respective object, which is a distinguishing element. The first object pertains to "John Doe". The second object pertains to "Jim Doe". Each object was returned with a number of elements-of-interest such a s a room number, a user id ("uid"), a surname ("sn"), a given name, a building name, a title, an indication of a related dimension ("locationUpnode"), the entities manager ("manager"), cost center id, and the like.

If the specific element of interest specified an absolutely unique distinguishing attribute such as a GUID that corresponds to a particular object stored in a data polyarchy 122, the server 102 will return all of the information stored in the data polyarchy 122 with respect to the particular object.

FIG. 7 shows user interface 600 displaying an exemplary PQL query with an elements-of-interest modifier data field 510-2 that specifies a limiting attribute with which to modify a result of a search. The limiting attribute corresponds to a set of objects represented by a polyarchical data schema 124. The elements-of-interest modifier data field indicates to a server that a response to a search operation is limited to presenting any identified data polyarchy 122 objects with respect to the limiting attribute.

In this example, the limiting attributes 510-2 are a common name ("cn") attribute and a unique identifier attribute. Thus, the various person objects 620 returned by the server indicate only those limiting attributes.

Figure 8:
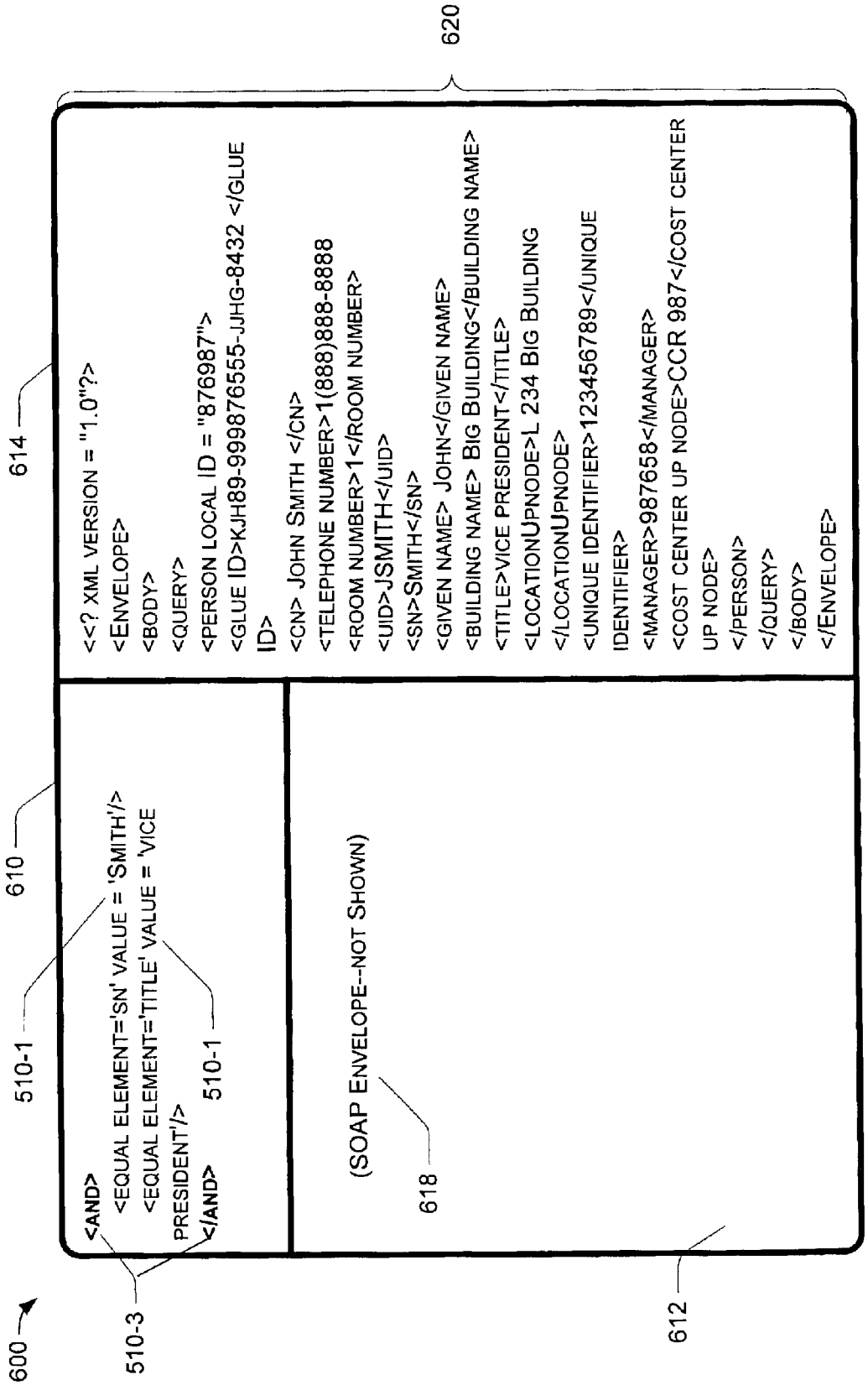
FIG. 8 is a block diagram of a UI displaying an exemplary PQL query and a corresponding exemplary PQL response. Specifically, the PQL query includes a Boolean modifier parameter to perform a mathematical operation with respect to polyarchies of data relationships.

FIG. 8 illustrates a user interface for an exemplary PQL query 500 that includes a Boolean modifier parameter 510-3 to perform a mathematical operation with respect to polyarchies of data relationships. A Boolean modifier is used to perform a filtering operation ("and"), a union operation ("or"), or an exclusion operation ("not") on one or more hierarchies of data relationships based on variable. The variable includes an object represented by the data polyarchy schema 124 of FIGS. 1 and 3, and Table 7, a hierarchy of objects represented by the schema, or polyarchies of objects represented by the schema, and so on.

For example, the "and" Boolean modifier 510-3 is used to filter the results of two data store searches based on specific elements-of-interest data fields 510-1. A first specific elements-of-interest data field specifies a surname ("sn") attribute with a value of "Smith". A second specific elements-of-interest data field specifies a "title" attribute with a value of "vice president". Thus, the Boolean modifier is used to narrow, or filter the results based on the respective search results. The result is a single object in the PQL response 620 that corresponds to vice president John Smith. If there were more than one set of entity information stored in a directory that matched this query 500, then each of the entities would be presented in the result.

Figure 9:
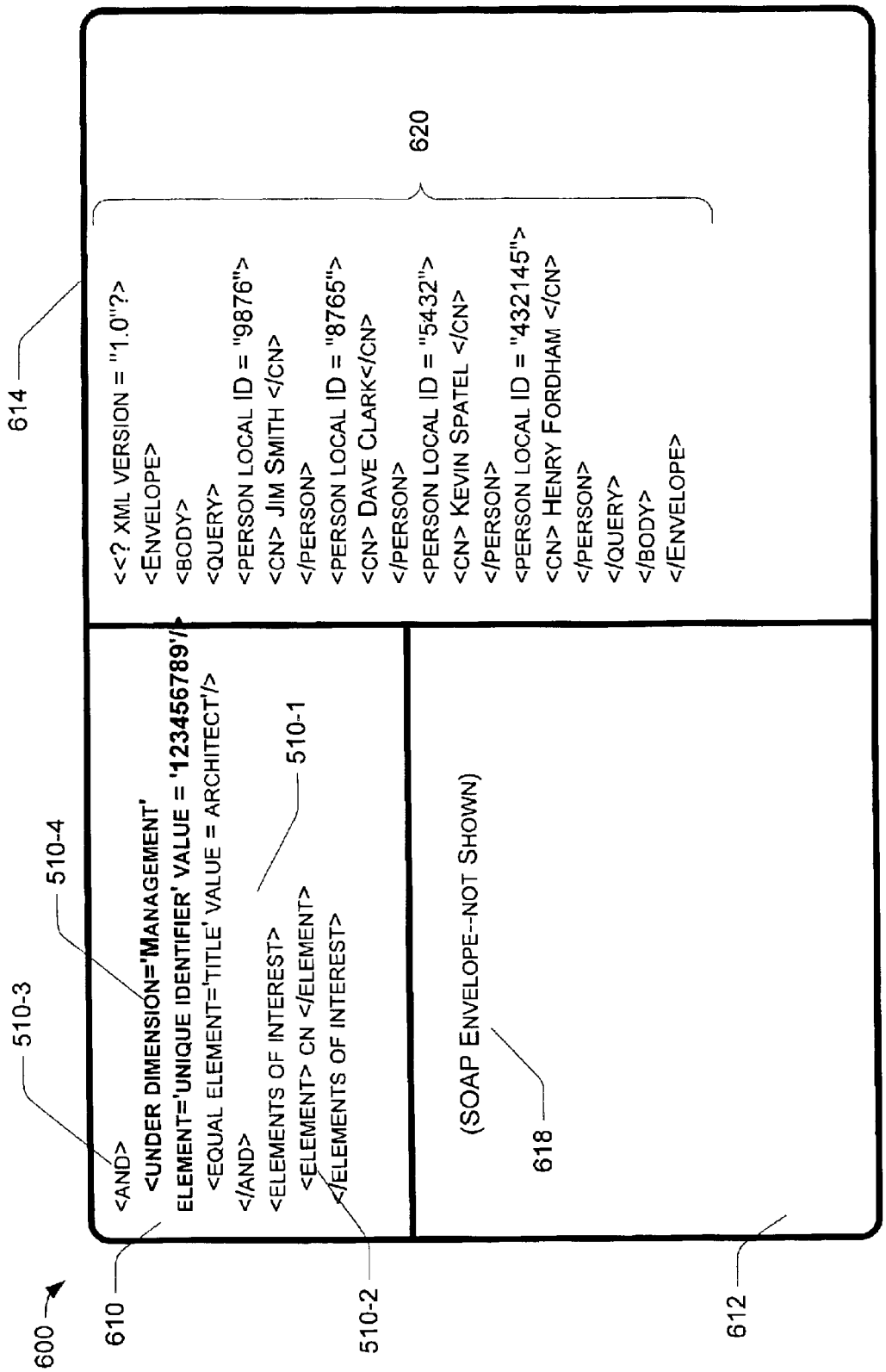
FIG. 9 is a block diagram of a UI showing an exemplary PQL query and a corresponding exemplary PQL response. Specifically, the PQL query includes a dimension information indicator parameter for specifying a dimension within which to view an object stored in a data store.

FIG. 9 shows a user interface 600 that in turn illustrates an exemplary PQL query 500 that includes a dimension information indicator data field 510-4 for specifying a dimension within which to present a response that corresponds to a search operation for an object stored in a data store. In this example, the "under" parameter 510-4 (or "clause") is combined with a filter 510-3 ("<and>") to find "architects" under John Smith, which as indicated has a corresponding "unique identifier" of "1234567898". (See, also John Smith's unique identifier of FIG. 8). Information corresponding to the architects under John Smith is presented in the PQL response 620 from the server 102. (Note how an elements-of-interest data field 510-2 was used to limit the number of elements presented in the results of the search).

Figure 10:
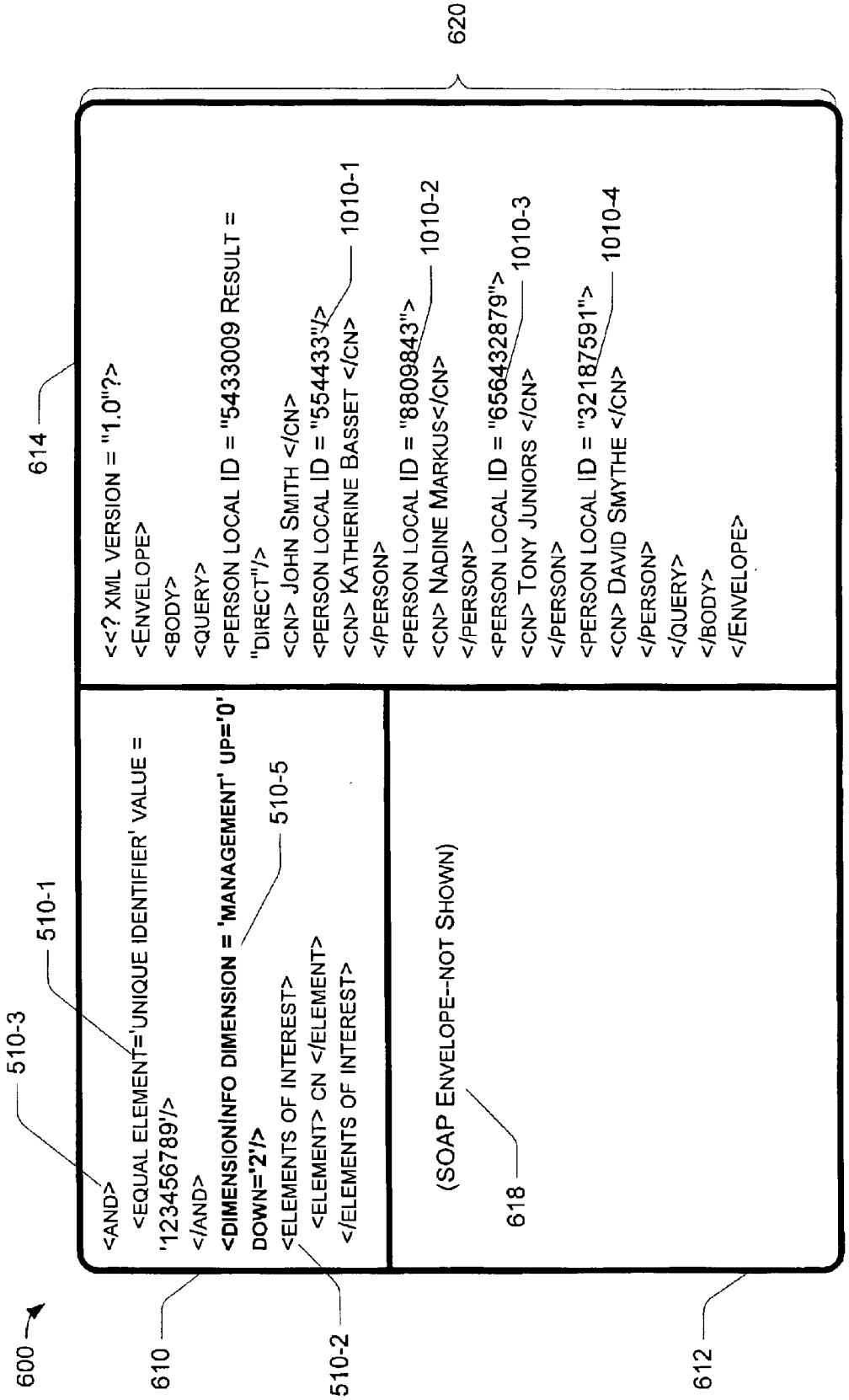
FIG. 10 is a UI showing an exemplary PQL query and a corresponding exemplary PQL response. Specifically, the PQL query includes a dimension information modifier parameter, which specifies a particular hierarchical direction and a particular hierarchical depth for a server process to present a data relationship between a complex object of a polyarchical data set and one or more other objects.

FIG. 10 shows user interface 600 for illustrating a PQL query 500 with a dimension information modifier data field 510-5. The dimension information modifier specifies a particular direction and a particular depth to present a data relationship between a complex object in a polyarchical schema and one or more different represented objects. The direction indicates whether the one or more (all objects with the use of a wildcard indication such as "*") different objects are sub objects of the complex object. The dimension information modifier can also specify SIBLINGS='true' to indicate that all objects with the same parent as the current object should be returned.

In this example, the dimension information modifier 510-5 is used to retrieve information 620 corresponding to a first level of subordinates 1010 from a data store. This is a jump gate because John Smith's subordinates 1010 are presented as aspects of John Smith's object definition 620.

FIG. 11 is a block diagram of a user interface 600 showing use of a filter parameter in a PQL query 500 with respect to a particular attribute and a subsequent intersection between two polyarchies of data relationships. In this example, two dimensions 510-4 (e.g., a "management" dimension and an "office location" dimension) are intersected and filtered 510-3 based on a "title" attribute of "architect". The search results 620 show the particular objects in the data store that match that query.

Figure 12:
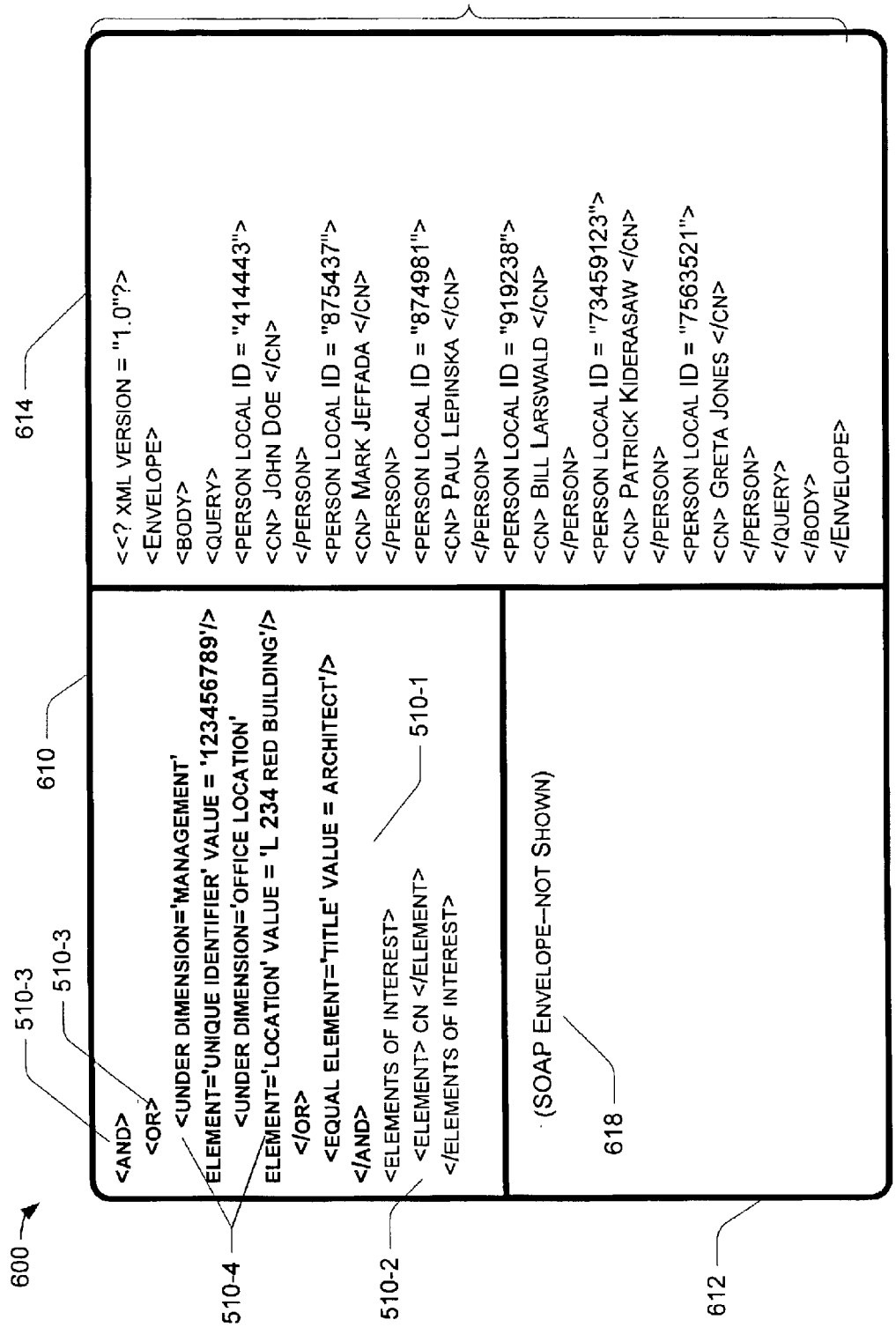
FIG. 12 is UI showing an exemplary PQL query and a corresponding exemplary PQL response. Specifically, the PQL query illustrates use of filter and union parameters with respect to two polyarchies of data relationships.

FIG. 12 shows the user interface 600 for illustrating a PQL 500 that specifies a filter ("and") 510-3 and a union ("or") 510-3 between two polyarchies 510-4 of data relationships. In this example, the filter and the union are Boolean modifiers. The union attribute is applied to the "management" dimension and the "office location" dimension. The filter specifies a "title" attribute of "architect", which is then applied to the union of the two hierarchies. The search results 620 show the particular objects in the data store that match that query.

Exemplary Procedure to Manage a Polyarchical Data Set

Figure 13:
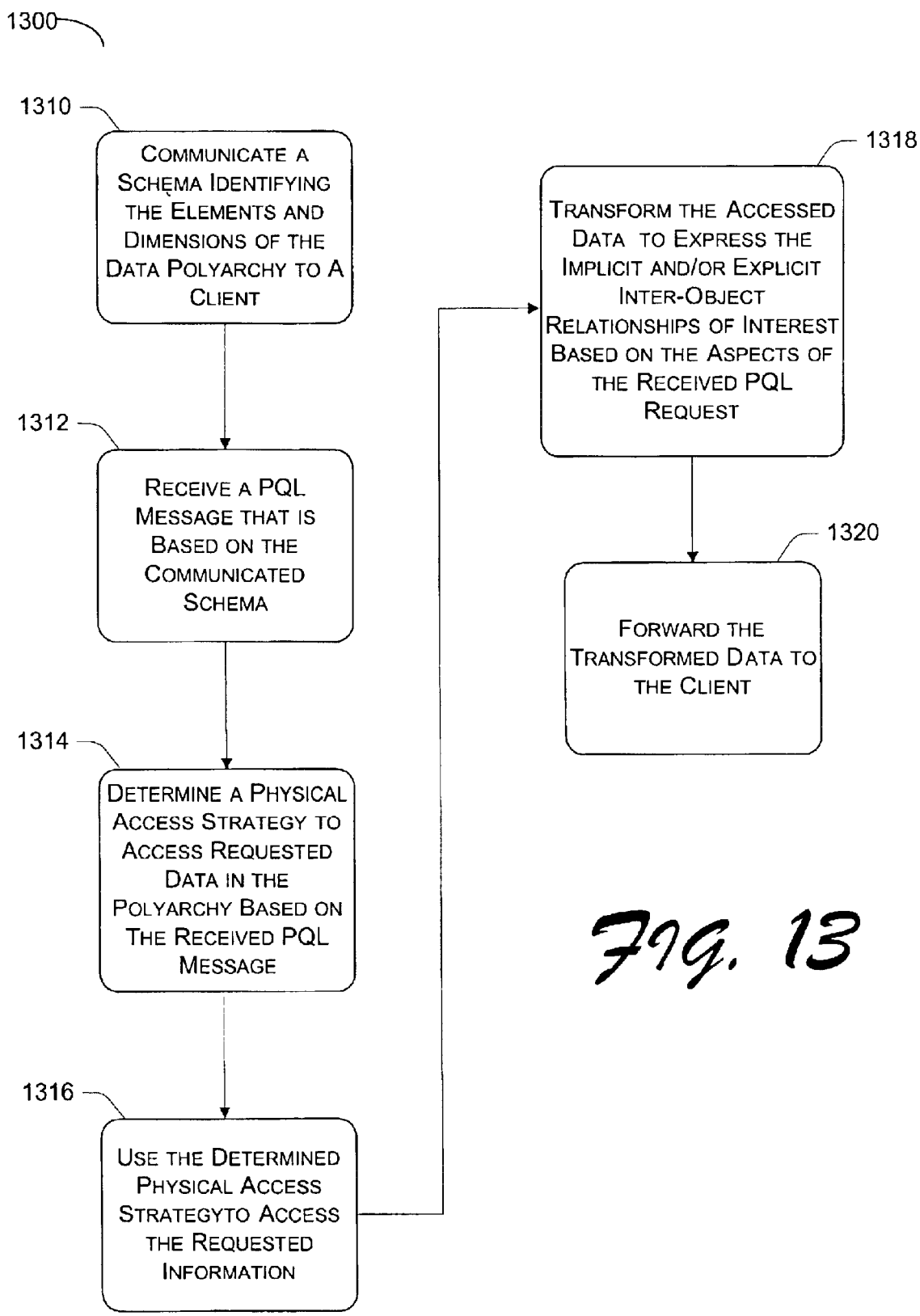
FIG. 13 illustrates aspects of an exemplary procedure to manage data (e.g., to access, present, provide, and/or manipulate objects, etc.) in a data polyarchy (i.e., multiple hierarchies of dynamically generated inter-object relationships that are based on the values of attributes of the objects).

FIG. 13 shows an exemplary procedure 1300 to manage data in a data polyarchy 122. At block 1310, the polyarchical data management module 120 communicates an elements-of-interest schema 124 to a client 110. The elements-of-interest schema 124 indicates to the client how objects in the data polyarchy can be accessed, manipulated, and presented by the client in a meaningful manner.

At block 1312, the polyarchical data management module 120 receives a PQL message 500 that is based on the communicated data polyarchy schema (block 1310). The request not only identifies one or more attributes of interest but also identifies the data relationships of interest. The request corresponds to a data object of the data objects in the polyarchical data set 122 of FIG. 1.

The received PQL message 500 may correspond to one or more operations including any combination of: (a) an operation to find a default search object of the data objects; (b) an operation to locate an object of the data objects that corresponds to a particular name; (c) an operation to obtain a default hierarchy of data relationships that correspond to a particular object of the data objects; (d) an operation to obtain a particular hierarchy of data relationships that correspond to a particular object of the data objects; (e) an operation to identify at least one subset of a plurality of hierarchies of data relationships that correspond to a particular object of the data objects; (f) an operation to obtain multiple hierarchies of data relationships that correspond to a particular object of the data objects; and so on.

At block 1314, the data polyarchy management module 120 determines a physical access strategy (e.g., a simple scan, a recursive scan, and so on) to identify data corresponding to the request from the data polyarchy 122. This determination is based on the request (block 1312), which in turn is based on the schema 124 that was communicated to the client 110 (block 1310). As already noted, the schema provides the client not only with information that corresponds to the possible contents of the data polyarchy, but also with includes information describing the possible polyarchies of data relationships that may pertain to any one object of interest (e.g., see the "<Dimension>" indicators shown in Table 7).

For instance, consider that if a client request (i.e., a PQL message 500) is designed to filter out all elements-of-interest that pertain to an object with the exception of an absolutely unique distinguishing attribute (e.g., a GUID and a common name that corresponds to the GUID), a simple scan of the data polyarchy 122 is an efficient technique to search for information regarding the distinguishing object of interest.

The request 500, however, may also indicate that a number of sub-objects should be presented with respect to a complex object (i.e., a jump gate) and then the results are to be subsequently modified by a union of a dimension of information that corresponds to the complex object that is orthogonal to one or more of the sub-objects. In this case, a recursive scan of the data polyarchy 122 is an efficient technique to search for information regarding the objects and inter-object relationships of interest.

In this manner, a PQL request message 500 identifying attributes and data relationships of interest also provides an optimized physical access strategy to search the data polyarchy 122 for such attributes and data relationships.

At block 1316, the data polyarchy management module 120 accesses the data from the polyarchy based on the determined physical access strategy (block 1314). The accessed datamay take a number of different forms. For instance,the accessed data may be independent of any inter-object relationship between the data object and any other object in the polyarchy. Additionally, the accessed object(s) may participate in one or more hierarchies of inter-object relationships with one or more different data objects in the polyarchy. In this case, the accessed object(s) and the one or more different objects comprise a similar attribute. As discussed above, these inter-object relationships may be orthogonal with respect to one another in one or more dimensions.

At block 1318, the polyarchical data management module 120 transforms the accessed data for issuing to the client 110. Specifically, accessed data is transformed based on the requirements of the specific PQL message 500 that was used to request the data (lock 1312). For instance, if the message indicates an Object with respect to a particular dimension, the implicit and explicit inter-object relationships of the accessed data are assembled into a hierarchy based on the particular dimension.

For example, an accessed data object represents a jump gate when the accessed data includes a complex object of the data objects that is related to one or more sub-objects of the data objects. In this case the complex object is transformed or represented as an independent surface entity. Each of the one or more sub-objects is described as a respective separate entity in a manner that is independent of the surface entity. The one or more sub-objects are then transformed or referenced in the surface entity to indicate a relationship between the complex object and the one or more sub-objects. The referencing is independent of any object naming or hierarchical data relationship between the complex object and the one or more sub-objects.

In another example, accessed data includes a first object of the data objects in the polyarchy that is related to one or more sub-objects. The first object is transformed or represented as an independent surface entity. Each of the one or more sub-objects is described as respective separate entities in a manner that is independent of the surface entity. Then, a respective link is included in each of the one or more sub-objects to reference the first object. In this manner, as in the previous example, the data is transformed to express the relationship of interest as indicated in the corresponding PQL message 500. At block 1320, data polyarchy management module 120 issues, or communicates the transformed data (block 1318) to the client.

Exemplary Computing Environment

Figure 14:
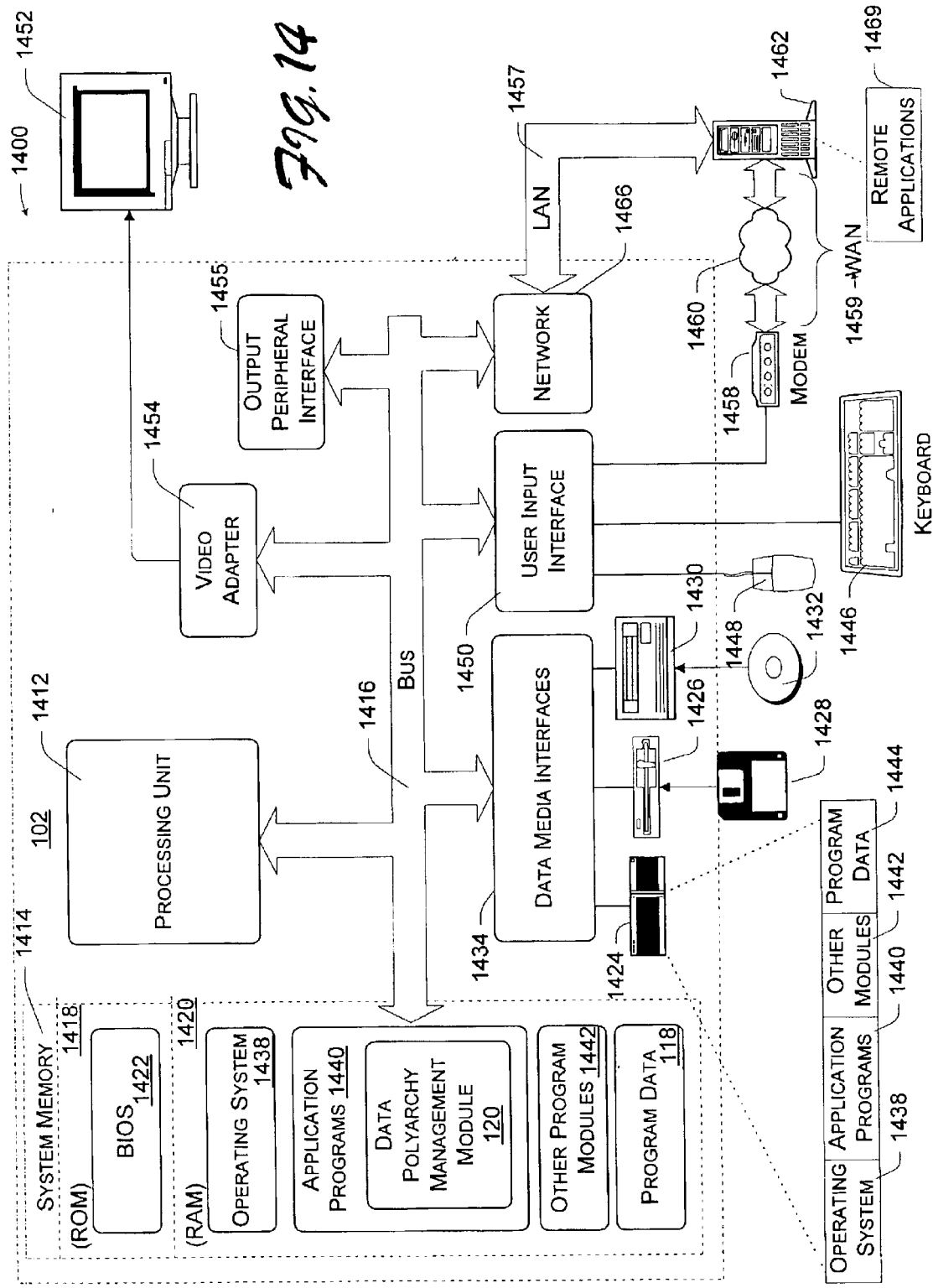
FIG. 14 shows aspects of an exemplary operating environment for managing a data polyarchy.

FIG. 14 illustrates an example of a suitable computing environment 1400 on which an exemplary data polyarchy server 102 of FIG. 1 may be implemented. The exemplary computing environment is only one example of a suitable computing environment and is not intended to suggest any limitation as to the scope of use or functionality of an exemplary data polyarchy server 102, a server 106, or a client 110. Neither should the computing environment 1400 be interpreted as having any dependency or requirement relating to any one or combination of components illustrated in the exemplary computing environment 1400.

The computer 1402 is operational with numerous other general purpose or special purpose computing system environments or configurations. Examples of well known computing systems, environments, and/or configurations that may be suitable for use with an exemplary computer 1402 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary computer 1402 may be described in the general context of computer-executable instructions, such as program modules, being executed by a computer. Generally, program modules include routines, programs, objects, components, data structures, and so on, that performs particular tasks or implements particular abstract data types. An exemplary computer 1402 may be practiced in distributed computing environments where tasks are performed by remote processing devices that are linked through a communications network. In a distributed computing environment, program modules may be located in both local and remote computer storage media including memory storage devices.

As shown in FIG. 14, the computing environment 1400 includes a general-purpose computing device in the form of a computer 1402. The components of computer 1402 may include, by are not limited to, one or more processors or processing units 1412, a system memory 1414, and a bus 1416 that couples various system components including the system memory 1414 to the processor 1412.

Bus 1416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Server 1402 typically includes a variety of computer readable media. Such media may be any available media that is accessible by computer 1402, and it includes both volatile and non-volatile media, removable and non-removable media.

In FIG. 14, the system memory 1414 includes computer readable media in the form of volatile memory, such as random access memory (RAM) 1420, and/or non-volatile memory, such as read only memory (ROM) 1418. A basic input/output system (BIOS) 1422, containing the basic routines that help to transfer information between elements within computer 1402, such as during start-up, is stored in ROM 1418. RAM 1420 typically contains data and/or program modules that are immediately accessible to and/or presently be operated on by processor 1412.

Computer 1402 may further include other removable/non-removable, volatile/non-volatile computer storage media. By way of example only, FIG. 14 illustrates a hard disk drive 1424 for reading from and writing to a non-removable, non-volatile magnetic media (not shown and typically called a "hard drive"), a magnetic disk drive 1426 for reading from and writing to a removable, non-volatile magnetic disk 1428 (e.g., a "floppy disk"), and an optical disk drive 1430 for reading from or writing to a removable, non-volatile optical disk 1432 such as a CD-ROM, DVD-ROM or other optical media. The hard disk drive 1424, magnetic disk drive 1426, and optical disk drive 1430 are each connected to bus 1416 by one or more interfaces 1434.

The drives and their associated computer-readable media provide nonvolatile storage of computer readable instructions, data structures, program modules, and other data for computer 1402. Although the exemplary environment described herein employs a hard disk, a removable magnetic disk 1428 and a removable optical disk 1432, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules 1440 may be stored on the hard disk, magnetic disk 1428, optical disk 1432, ROM 1418, or RAM 1420, including, by way of example, and not limitation, an operating system 1438, one or more application programs 1440, other program modules 1442, and program data 1444.

Each of such operating system 1438, one or more application programs 1440 (e.g., a polyarchy data management module 120), other program modules 1442, and program data 1444 (e.g., the data polyarchy 122 and the elements-of-interest schema 124)—or some combination thereof, may include an implementation of an exemplary data polyarchy server 102 of FIG. 1. Specifically, each may include an implementation of a data polyarchy server 102 to:

(a) dynamically generate, manage, and update a data polyarchy 122 based on attribute values of the objects;
(b) analyze the data polyarchy based on relative distribution of attributes to generate an elements of interest schema indicating how objects in the data polyarchy can be meaningfully presented and manipulated within various inter-object relationships;
(c) communicate the elements-of-interest schema 124 to a client 110;
(d) responsive to receiving a query (e.g., a PQL message 500) based on the schema, determine a physical access strategy to access the requested data from a polyarchical data set 122;
(e) access and transform the data based on the query request; and,
(f) issue the transformed data to the client as a response.

A user may enter commands and information into computer 1402 through optional input devices such as keyboard 1446 and pointing device 1448 (such as a "mouse"). Other input devices (not shown) may include a microphone, joystick, game pad, satellite dish, serial port, scanner, or the like. These and other input devices are connected to the processing unit 1412 through a user input interface 1450 that is coupled to bus 1416, but may be connected by other interface and bus structures, such as a parallel port, game port, or a universal serial bus (USB).

An optional monitor 1452 or other type of display device is also connected to bus 1416 via an interface, such as a video adapter 1454. In addition to the monitor, personal computers typically include other peripheral output devices (not shown), such as speakers and printers, which may be connected through output peripheral interface 1455.

Computer 1402 may operate in a networked environment using logical connections to one or more remote computers, such as a remote server/computer 1462 (e.g., data servers 106). Remote computer 1462 may include many or all of the elements and features described herein relative to computer 1402.

Logical connections shown in FIG. 14 are a local area network (LAN) 1457 and a general wide area network (WAN) 1459. Such networking environments are commonplace in offices, enterprise-wide computer networks, intranets, and the Internet. When used in a LAN networking environment, the computer 1402 is connected to LAN 1457 via network interface or adapter 1466. When used in a WAN networking environment, the computer typically includes a modem 1458 or other means for establishing communications over the WAN 1459. The modem, which may be internal or external, may be connected to the system bus 1416 via the user input interface 1450 or other appropriate mechanism.

Depicted in FIG. 14, is a specific implementation of a WAN via the Internet. Computer 1402 typically includes a modem 1458 or other means for establishing communications over the Internet 1460. Modem, which may be internal or external, is connected to bus 1416 via interface 1450.

In a networked environment, program modules depicted relative to the personal computer 1402, or portions thereof, may be stored in a remote memory storage device. By way of example, and not limitation, FIG. 14 illustrates remote application programs 1469 as residing on a memory device of remote computer 1462. It will be appreciated that the network connections shown and described are exemplary and other means of establishing a communications link between the computers may be used.

Computer Readable Media

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

The described arrangements and procedures replace traditional notions of distinguished names that represent inter-object relationships within a static hierarchy. More specifically, the described arrangements and procedures replace these traditional notions with dynamically generated graphs of inter-object connections in multiple dimensions of data relationships based on attributes of the objects. In this manner, complex real-world objects are represented with respect to the particular objects themselves, with respect to any set of decomposed sub-entities, or sub-objects that are related to the particular objects. These inter-object relationships are managed and navigated using a data polyarchy schema 124 that has been generated to access elements of interest in the data polyarchy 122.

Although the described subject matter to generate and manage polyarchies of data relationships has been described in language specific to structural features and/or methodological operations, it is to be understood that the subject defined in the appended claims is not necessarily limited to the specific features or operations described. Rather, the specific features and steps are disclosed as preferred forms of implementing the claimed present invention.

What is claimed is:

1. In a computer system, a method comprising:
    dynamically generating a schema to represent multiple hierarchies of inter-object relationships between a plurality of objects in a data polyarchy, the schema being generated based on values of attributes of the objects;
    receiving a request based on the schema from a client, the request comprising a dimension information modifier to specify a particular direction and a particular depth to retrieve information from the data polyarchy, the dimension information modifier is a siblings indication to retrieve all objects with a same parent as a current object in the data polyarchy; and
    responsive to receiving the request:
        accessing an object of the objects based on the request;
        transforming the object into transformed data that expresses any inter-object relationship between the object and any other object of the objects based on the request; and
        issuing the transformed data to the client.

2. A method as recited in claim 1, wherein the inter-object relationships comprise a flat relationship, a hierarchical relationship, and multiple intersecting hierarchies of relationships.

3. A method as recited in claim 1, where the objects comprise enterprise resource planning (ERP) objects, directory based objects, or database objects.

4. A method as recited in claim 1, wherein generating the schema further comprises:
    identifying a plurality of attributes of interest based on values of attributes of the objects;
    identifying one or more dimensions of inter-object relationships within which object that comprise at least a subset of the attributes of interest participate.

5. A method as recited in claim 1, wherein the schema is designed to provide access control to organizational resources.

6. A method a recited in claim 1, further comprising communicating the schema to a client, the schema identifying how the client can access object in the data polyarchy.

7. A method as recited in claim 1, wherein the transformed data expresses the inter-object relationships with respect to other objects in a same dimension or other objects in a different dimension, the same and/or the different dimension being indicated by the request.

8. A method as recited in claim 1, wherein the request comprises a limiting attribute to limit the transformed data by presenting the one or more objects only with respect to the limiting attribute.

9. A method as recited in claim 1, wherein the request queries for information corresponding to an object in the data polyarchy with respect to one or more particular dimensions.

10. A method as recited in claim 1, wherein the request further comprises a dimension indicator to specify one or more hierarchies within which the data is to be presented in the transformed data.

11. A method as recited in claim 1, wherein the request further comprises a distinguishing attribute, a classifying attribute, or a locating attribute.

12. A method as recited in claim 1, wherein the request indicates that at least one subset of the objects comprise a similar attribute; and wherein accessing one or more objects further comprises:
    retrieving the one or more objects in a manner that is independent of any hierarchical data relationship between the data objects in the at least one subset.

13. A method as recited in claim 12, wherein the similar attribute comprises a logical domain selected from a distinguishing domain, a locating domain or a classifying domain.

14. A method as recited in claim 1, wherein the request corresponds to at least a first and second subset of the objects, the request comprising a logical modifier that specifies an operation, and wherein the method further comprises:
    responsive to receiving the request, identifying at least a portion of the first and second subsets of directory objects in the polyarchical data set; and
    wherein transforming the one or more objects further comprises performing the operation on the first and second subsets.

15. A method as recited in claim 14, wherein the logical modifier is a Boolean modifier.

16. A method as recited in claim 14, wherein the operation comprises any combination of filtering, union, intersection, join, and/or exclusion operations.

17. A method as recited in claim 1, wherein accessing the object for comprises accessing the object in a manner that is independent of any inter-object relationship between the object and any other object of the objects in a manner that is independent of any definition of a hierarchy in the data polyarchy.

18. A method as recited in claim 1, wherein accessing the object further comprises querying the data polyarchy for the object.

19. A method as recited in claim 1, wherein accessing the object further comprises managing, manipulating or modifying the object or a relationship between the object and one of more of the other objects.

20. A computer-readable medium comprising computer-program instructions executable by a processor for:
    dynamically generating a schema to represent multiple hierarchies of inter-object relationships between a plurality of objects in a data polyarchy, the schema being generated based on values of attributes of the objects, the schema indicating each attribute of interest in the data polyarchy, the schema further indicating any of one or more dimensions of inter-object relationships within which objects that comprise at least a subset of the attributes of interest participate;

receiving a request from a client based on the schema, the request comprising a dimension information modifier to specify a particular direction and a particular depth to retrieve information from the data polyarchy, the dimension information modifier being a siblings indication to retrieve all objects with a same parent as a current object in the data polyarchy;

responsive to receiving the request:

accessing at least one object in the data polyarchy based on the request;

transforming the at least one object into transformed data that expresses any inter-object relationship between the at least one object and any other objects of the objects based on the request; and issuing the transformed data to the client.

21. A computer-readable medium as recited in claim 20, wherein the inter-object relationships comprise a flat relationship, a hierarchical relationship, and multiple intersecting hierarchies of relationships.

22. A computer-readable medium as recited in claim 20, where the objects comprise enterprise resource planning (ERP) objects, directory based objects, or database objects.

23. A computer-readable medium as recited in claim 20, further comprising computer-executable instructions for communicating the schema to a client to indicate how the client is to interface with the objects in the data polyarchy.

24. A computer-readable medium as recited in claim 20, wherein the transformed data expresses the inter-object relationships with respect to other objects in a same dimension or other objects in a different dimension, the same and/or the different dimension being indicated by the request.

25. A computer-readable medium as recited in claim 20, wherein the request comprises a limiting attribute to limit the transformed data by presenting the one or more objects only with respect to the limiting attribute.

26. A computer-readable medium as recited in claim 20, wherein the request queries for information corresponding to an object in the data polyarchy with respect to one or more particular dimensions.

27. A computer-readable medium as recited in claim 20, wherein the request comprises a dimension indicator to specify one or more hierarchies within which the data is to be presented in the transformed data.

28. A computer-readable medium as recited in claim 20, wherein the request further comprises a distinguishing attribute, a classifying attribute, or a locating attribute.

29. A computer-readable medium as recited in claim 20, wherein the request indicates that at least one subset of the objects comprise a similar attribute; and wherein the computer executable instructions for accessing one or more objects further comprise instructions for:

retrieving the one or more objects in a manner that is independent of any hierarchical data relationship between the data objects in the at least one subset.

30. A computer-readable medium as recited in claims 29, wherein the similar attribute comprises a logical domain selected from a distinguishing domain, a locating domain or a classifying domain.

31. A computer-readable medium as recited in claim 20, wherein the request corresponds to at least a first and second subset of the objects, the request comprising a logical modifier that specifies an operation, and wherein the computer-executable instructions further comprises instructions for:

responsive to receiving the request, identifying at least a portion of the first and second subsets of directory objects in the polyarchical data set; and wherein transforming the one or more objects further comprises performing the operation on the first and second subsets.

32. A computer-readable medium as recited in claim 31, wherein the logical modifier is a Boolean modifier.

33. A computer-readable medium as recited in claim 31, wherein the operation comprises any combination of filtering, union, intersection, join, and/or exclusion operations.

34. A computer-readable medium as recited in claim 20, wherein accessing the at least one object further comprises accessing the at least one object in a manner that is independent of any inter-object relationship between the at least one object and any other object of the objects in a manner that is independent of any definition of a hierarchy in the data polyarchy.

35. A computer-readable medium as recited in claim 20, wherein accessing the at least one object further comprises querying the data polyarchy for the at least one object.

36. A computer-readable medium as recited in claim 20, wherein accessing the at least one object further comprises managing, manipulating, or modifying the at least one object or a relationship between the at least one object and one of more different objects of the objects.

37. A computer comprising:

a memory comprising the computer-executable instructions; and a processor coupled to the memory, the processor being configured to fetch and execute the computer-executable instructions for:

dynamically generating a schema to represent multiple hierarchies of inter-object relationships between a plurality of objects in a data polyarchy, the schema being generated based on values of attributes of the objects, the schema indicating each attribute of interest in the data polyarchy, the schema further indicating any of one or more dimensions of inter-object relationships within which objects that comprise at least a subset of the attributes of interest participate;

receiving, a request from a client based on the schema, the request comprising a dimension information modifier to specify a particular direction and a particular depth to retrieve information from the data polyarchy, the dimension information modifier being a siblings indication to retrieve all objects with a same parent as a current object in the data polyarchy;

responsive to receiving the request:

accessing one of more objects in the data polyarchy based on the request;

transforming the one or more of the objects into transformed data that expresses any inter-object relationships based on the request; and issuing the transformed data to the client.

38. A computer as recited in claim 37, wherein the inter-object relationships comprises a flat relationship, a hierarchical relationship, and multiple intersecting hierarchies of relationships.

39. A computer as recited in claim 37, where the objects comprise enterprise resource planning (ERP) object, directory based objects, or database objects.

40. A computer as recited in claim 37, wherein the computer-executable instructions further comprise instructions for communicating the schema to a client to indicate how the client is to interface with the objects in the data polyarchy.

41. A computer as recited in claim 37, wherein the transformed data expresses the inter-object relationships with respect to other objects in a same dimension or other objects in a different dimension, the same and/or the different dimension being indicated by the request.

42. A computer as recited in claim 37, wherein the request comprises a limiting attribute to limit the transformed data by presenting the one or more objects only with respect to the limiting attribute.

43. A computer as recited in claim 37, wherein the request queries for information corresponding to an object in the data polyarchy with respect to one or more particular dimensions.

44. A computer as recited in claim 37, wherein the request comprises a dimension indicator to specify one or more hierarchies within which the data is to be presented in the transformed data.

45. A computer as recited in claim 37, wherein the request further comprises a distinguishing attribute, a classifying attribute, or a locating attribute.

46. A computer as recited in claim 37, wherein the request indicates that at least one subset of the objects comprise a similar attribute; and wherein the computer-executable instructions for accessing one or more objects further comprise instructions for:

retrieving the one or more objects in a manner that is independent of any hierarchical data relationship between the data objects in the at least one subset.

47. A computer a recited in claim 46, wherein the similar attribute comprises a logical domain selected from a distinguishing domain, a locating domain or a classifying domain.

48. A computer as recited in claim 37, wherein the request corresponds to at least a first and second subset of the objects, the request comprising a logical modifier that specifies an operation, and wherein the computer-executable instructions further comprises instructions for:

responsive to receiving the request, identifying at least a portion of the first and second subsets of directory objects in the polyarchical data set; and wherein transforming the one or more objects further comprises performing the operation on the first and second subsets.

49. A computer as recited in claim 48, wherein the logical modifier is a Boolean modifier.

50. A computer as recited in claim 48, wherein the operation comprises any combination of filtering, union, intersection, join, and/or exclusion operations.

51. A computer as recited in claim 37, wherein accessing the one or more objects further comprises accessing the one or more objects in a manner that is independent of any inter-object relationship between the one or more objects and any other object of the objects in a manner that is independent of any definition of a hierarchy in the data polyarchy.

52. A computer as recited in claim 37, wherein accessing the one or more objects further comprises querying the data polyarchy for the one or more objects.

53. A computer as recited in claim 37, wherein accessing the one or more object further comprises managing, manipulating, or modifying the one or more objects or a relationship between an object of the one or more objects and one of more different objects of the objects.

54. A computer comprising:

processing means for dynamically generating a schema to represent multiple hierarchies of inter-object relationships between a plurality of objects in a data polyarchy, the schema being generated based on values of attributes of the objects, the schema indicating each attribute of interest in the data polyarchy, the schema further indicating any of one or more dimensions of inter-object relationships within which objects that comprise at least a subset of the attributes of interest participate;

receiving a request based on schema from a client the request comprising a dimension information modifier to specify a particular direction and a particular depth to retrieve information from the data polyarchy, the dimension information modifier being a siblings indication to retrieve all objects with a same parent as a current object in the data polyarchy;

responsive to receiving the request;

accessing one or more objects in the data polyarchy, base on the request;

transforming the one or more of the objects transformed data that expresses any inter-object relationships based on the request; and issuing the transformed data to the client.

55. A computer as recited in claim 54, wherein the inter-object relationships comprise a flat relationship, a hierarchical relationship, and multiple intersecting hierarchies of relationships.

56. A computer as recited in claim 54, wherein the objects comprise enterprise resource planning (ERP) objects, directory based objects, or database objects.

57. A computer as recited in claim 54, further comprising processing means for communicating the schema to a client to indicate how the client is to interface with the objects in the data polyarchy.

58. A computer as recited in claim 54, wherein the transformed data expresses the inter-object relationships with respect to other objects in a same dimension or other objects in a different dimension, the same and/or the different dimension being indicated by the request.

59. A computer as recited in claim 54, wherein the request comprises a limiting attribute to limit the transformed data by presenting the one or more objects only with respect to the limiting attribute.

60. A computer as recited in claim 54, wherein the request queries for information corresponding to an object in the data polyarchy with respect to one or more particular dimensions.

61. A computer as recited in claim 54, wherein the request comprises a dimension indicator to specify one or more hierarchies within which the data is to be presented in the transformed data.

62. A computer as recited in claim 54, wherein the request further comprises a distinguishing attribute, a classifying attribute, or a locating attribute.

63. A computer as recited in claim 54, wherein the request indicates that at least one subset of the objects comprise a similar attribute; and wherein the means for accessing one or more objects further comprise means for:

retrieving the one or more objects in a manner that is independent of any hierarchical data relationship between the data objects in the at least one subset.

64. A computer as recited in claim 63, wherein the similar attribute comprises a logical domain selected from a distinguishing domain, a locating domain or a classifying domain.

65. A computer as recited in claim 54, wherein the request corresponds to at least a first and second subset of the objects, the request comprising a logical modifier that specifies an operation, and wherein the processing means further comprise means for:

responsive to receiving the request, identifying at least a portion of the first and second subsets of directory objects in the polyarchical data set; and wherein transforming the one or more objects further comprises performing the operation on the first and second subset.

66. A computer as recited in claim 65, wherein the logical modifier is a Boolean modifier.

67. A computer as recited in claim 65, wherein the operation comprises any combination of filtering, union, intersection, join, and/or exclusion operations.

68. A computer as recited in claim 54, wherein the means for accessing the one or more objects further comprises means for accessing the one or more objects in a manner that is independent of any inter-object relationship between the one or more objects and any other object of the objects in a manner that is independent of any definition of a hierarchy in the data polyarchy.

69. A computer as recited in claim 54, wherein the means for accessing the one or more objects further comprises querying the data polyarchy for the one or more objects.

70. A computer as recited in claim 54, wherein the means for accessing the one or more objects further comprises means for managing, manipulating, or modifying the one or more objects or a relationship between an object of the one or more objects and one of more different objects of the objects.

* * * * *

UNITED STATES PATENT AND TRADEMARK OFFICE
CERTIFICATE OF CORRECTION

| | |
|---|---|
| PATENT NO. | : 6,944,626 B2 |
| APPLICATION NO. | : 09/995415 |
| DATED | : September 13, 2005 |
| INVENTOR(S) | : Kim Cameron et al. |

It is certified that error appears in the above-identified patent and that said Letters Patent is hereby corrected as shown below:

On the title page, in field (56), under "U.S. Patent Documents", in column 2, line 5, after "et al." insert -- G06F 07/00 --.

In column 2, line 28, after "business" insert -- ' --.

In column 3, line 8, after "counter-intuitive" delete "," and insert -- . --, therefor.

In column 3, line 34, delete "soon" and insert -- so on --, therefor.

In column 6, line 20, delete "eg.," and insert -- e.g., --, therefor.

In column 6, line 23, after "on" delete "," and insert -- . --, therefor.

In column 6, line 47, delete "XL" and inseert -- XML --, therefor.

In column 8, line 43, delete "toga" and insert -- to a --, therefor.

In column 8, line 55, after "domains" delete "," and insert -- . --, therefor.

In column 9, line 2, delete "upnodes" and insert -- up-nodes --, therefor.

In column 9, line(s) 2-3, delete "down nodes" and insert -- down-nodes --, therefor.

In column 9, line 17, after "error)" delete "," and insert -- . --, therefor.

In column 12, line 17, after "or" delete ".".

In column 12, line 56, after "TABLE 6" delete "," and insert -- . --, therefor.

In column 13, line 14, delete "memberIs" and insert -- memberIs --, therefor.

In column 13, line 28, after "manner" delete "," and insert -- . --, therefor.

In column 14, line 40, after "schema" delete "," and insert -- . --, therefor.

In column 24, line 63, delete "a s" and insert -- as --, therefor.

In column 27, line 39, delete "lock" and insert -- block --, therefor.

UNITED STATES PATENT AND TRADEMARK OFFICE
CERTIFICATE OF CORRECTION

| | |
|---|---|
| PATENT NO. | : 6,944,626 B2 |
| APPLICATION NO. | : 09/995415 |
| DATED | : September 13, 2005 |
| INVENTOR(S) | : Kim Cameron et al. |

It is certified that error appears in the above-identified patent and that said Letters Patent is hereby corrected as shown below:

In column 27, line 40, delete "Object" and insert -- object --, therefor.

In column 27-28, line(s) 67 and 1-2, delete "At block 1320, data polyarchy management module 120 issues, or communicates the transformed data (block 1318) to the client." and insert -- At block 1320, data polyarchy management module 120 issues, or communicates the transformed data (block 1318) to the client. --, therefor on Col. 28, Line 1 as a new paragraph.

In column 31, line 63, in Claim 4, delete "object" and insert -- objects --, therefor.

In column 32, line 1, in Claim 6, delete "a" and insert -- as --, therefor.

In column 32, line 3, in Claim 6, delete "object" and insert -- objects --, therefor.

In column 32, line 50, in Claim 17, delete "for" and insert -- further --, therefor.

In column 32, line 59, in Claim 19, after "manipulating" insert -- , --.

In column 33, line(s) 56-57, in Claim 29, delete "computer executable" and insert -- computer-executable --, therefor.

In column 33, line 62, in Claim 30, delete "claims" and insert -- claim --, therefor.

In column 34, line 3, in Claim 31, delete "comprises" and insert -- comprise --, therefor.

In column 34, line 47, in Claim 37, after "receiving" delete ",".

In column 34, line 55, in Claim 37, delete "of" and insert -- or --, therefor.

In column 34, line 62, in Claim 38, delete "comprises" and insert -- comprise --, therefor.

UNITED STATES PATENT AND TRADEMARK OFFICE
CERTIFICATE OF CORRECTION

PATENT NO.       : 6,944,626 B2
APPLICATION NO.  : 09/995415
DATED            : September 13, 2005
INVENTOR(S)      : Kim Cameron et al.

It is certified that error appears in the above-identified patent and that said Letters Patent is hereby corrected as shown below:

In column 34, line 66, in Claim 39, delete "object" and insert -- objects --, therefor.

In column 35, line 34, in Claim 47, delete "a" and insert -- as --, therefor.

In column 35, line 41, in Claim 48, delete "comprises" and insert -- comprise --, therefor.

In column 35, line 64, in Claim 53, delete "object" and insert -- objects --, therefor.

In column 36, line 12, in Claim 54, after "on" insert -- the --.

In column 36, line 12, in Claim 54, after "client" insert -- , --.

In column 36, line 20, in Claim 54, after "polyarchy" delete ",".

In column 36, line 29, in Claim 56, delete "wherein" and insert -- where --, therefor.

Signed and Sealed this

Twenty-first Day of July, 2009

JOHN DOLL
*Acting Director of the United States Patent and Trademark Office*